United States Patent [19]

Asano et al.

[11] Patent Number: 4,477,763

[45] Date of Patent: Oct. 16, 1984

[54] METHOD OF CONTROLLING INVERTER AND SYSTEM THEREFOR

[75] Inventors: Katsuhiro Asano, Toyoake; Yuzuru Tsunehiro, Kasugai, both of Japan

[73] Assignee: Kabushi Kaisha Toyota Chuo Kenkyusho, Japan

[21] Appl. No.: 518,147

[22] Filed: Jul. 28, 1983

[30] Foreign Application Priority Data

Aug. 2, 1982 [JP] Japan ................................ 57-135023

[51] Int. Cl.³ .............................................. H02P 7/42
[52] U.S. Cl. .................................... 318/811; 318/807; 318/809
[58] Field of Search .............................. 318/798–811, 318/316, 720–723

[56] References Cited

U.S. PATENT DOCUMENTS

| | | | |
|---|---|---|---|
| 3,805,135 | 4/1974 | Blaschke | 318/803 |
| 4,041,361 | 8/1977 | Cornell | 318/802 |
| 4,281,276 | 7/1981 | Cutler et al. | 318/810 |
| 4,282,473 | 8/1981 | Dreiseitl et al. | 318/805 |
| 4,320,331 | 3/1982 | Plunkett | 318/808 |
| 4,388,577 | 6/1983 | Blaschke et al. | 318/808 |

*Primary Examiner*—B. Dobeck
*Assistant Examiner*—Arthur G. Evans
*Attorney, Agent, or Firm*—Parkhurst & Oliff

[57] ABSTRACT

Method and system of controlling an inverter are disclosed. A reference rotary magnetic flux as a desired magnetic flux of an AC motor is so determined as to make a uniform rotary motion, an actual magnetic flux of the AC motor is detected, voltage vectors are selected such that a deviation between this reference rotary magnetic flux and the magnetic flux of the AC motor may be a value held within a tolerance, and switching elements of the inverter are on-off controlled so that the voltage vectors thus selected can be obtained.

20 Claims, 30 Drawing Figures

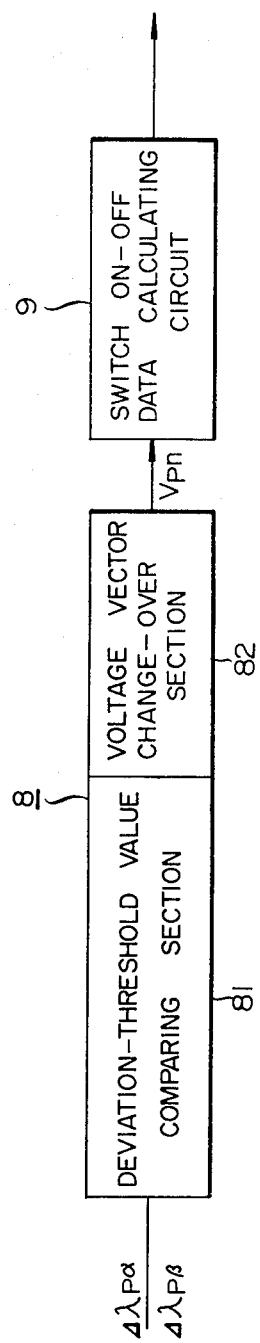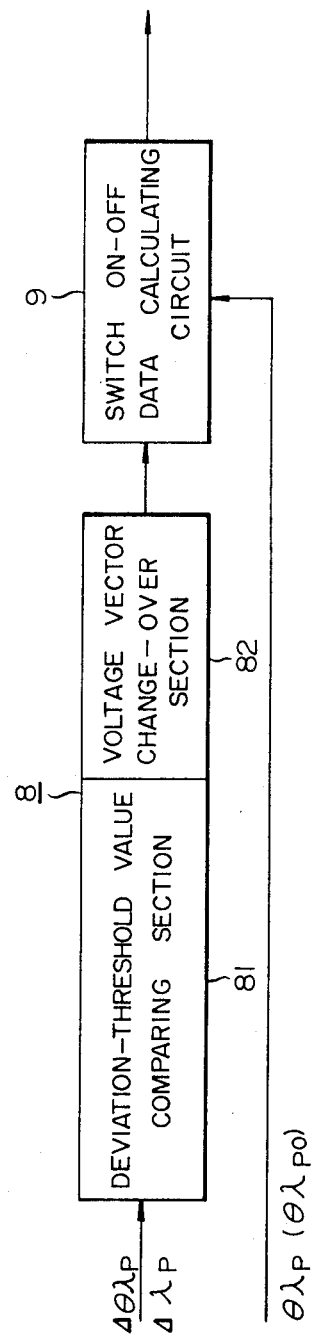

FIG. 21
——— FIRST CONTROL VECTOR
– – – – – SECOND CONTROL VECTOR
—·—·— THIRD CONTROL VECTOR
(A)
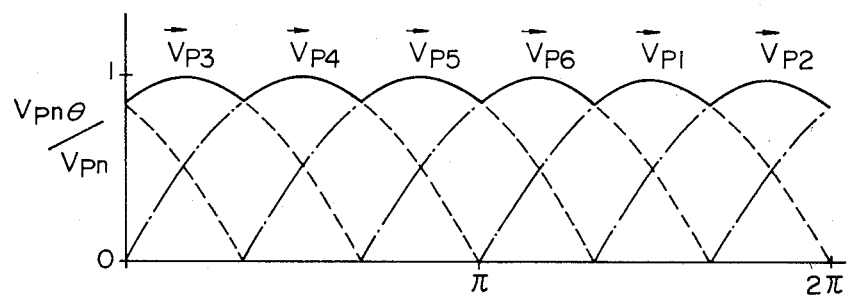
(B)
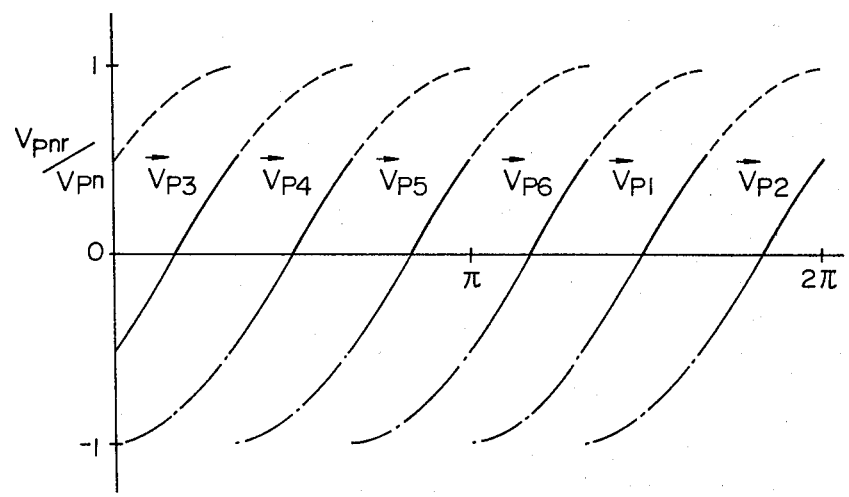

FIG. 25
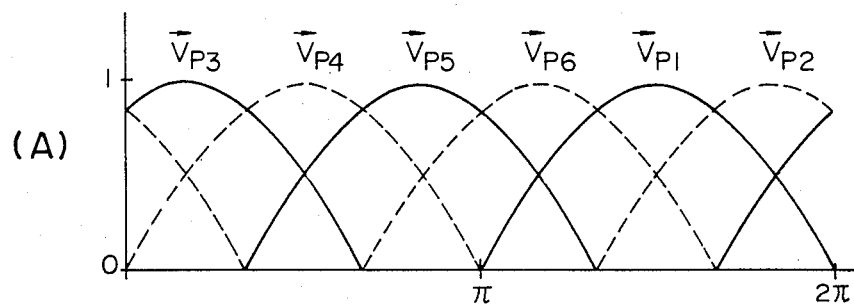
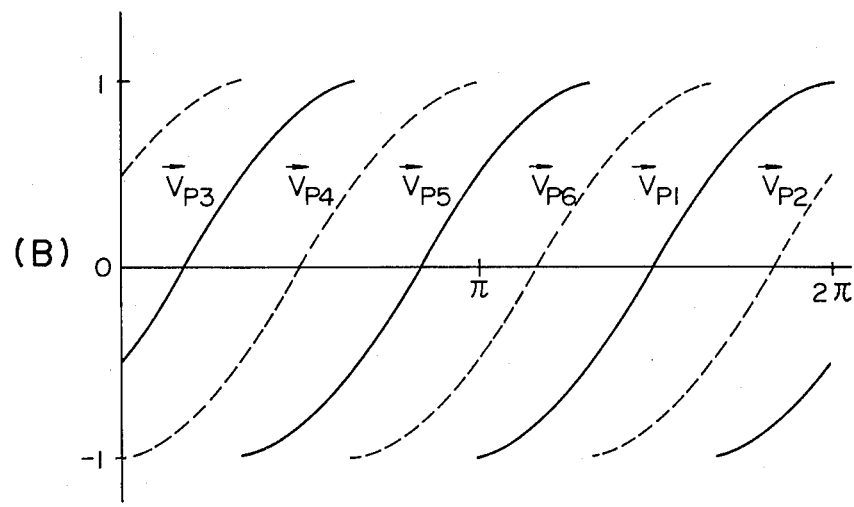

METHOD OF CONTROLLING INVERTER AND SYSTEM THEREFOR

BACKGROUND OF THE INVENTION

1. Field of the Invention

This invention relates to method of controlling an inverter for pulse-width modulating (hereinafter referred to as "PWM") a voltage source inverter for driving a three phase AC load and system therefor.

2. Description of the Prior Art

FIG. 1 is a circuit diagram theoretically showing the arrangement in which an AC motor i.e. induction motor (IM) is driven by a voltage source inverter 3 which is connected between a DC power source 1 outputting a DC voltage Vd and the AC motor 2, and the voltage source inverter 3 switches semiconductor switches 31, 32 and 33 equal in number to the load phases at a predetermined cycle to thereby obtain three phase alternating currents.

The voltage source inverter 3 having the above-described arrangement can take a potential of anode or cathode of the DC power source 1. Then, there has generally been practiced such a PWM control that, in order to control the speed of the AC motor in a wide range, a multiplicity of notches are applied to a square output waveform, and the positions and widths of these notches are controlled, whereby an output voltage waveform and its effective value are controlled. The final object of this control resides in that a magnetic flux as being a vectorial value connected in interlinkage to a rotor of a motor is caused to make a uniform rotary motion at a desired scale and a desired rotary speed. With this arrangement, a higher harmonic current flowing to the motor can be removed to a considerable extent, so that the iron loss and copper loss due to the harmonic contents of the waveform can be decreased and the torque pulsation can be reduced.

Now, as a method of conducting the PWM control, there has heretofore been used a triangle interception method. According to this method, mean values with time of the respective phase potentials are approximated to sinusoidal waves. To state specifically, there is obtained as an inverter a rectangular wave signal having as its on-off cycle the intersections between a desired sinusoidal wave and a triangular wave signal having a predetermined cycle.

As for the maximum amplitudes of sinusoidal waves which can be approximated to the phase potentials in the above-described control, phase potentials va and vb of two phases out of the three phases may be shown as in FIGS. 2(a) and 2(b). Each of the values is one half the DC voltage Vd, and the maximum amplitude vab of the line voltage is extracted through the following equation.

$$vab = va - vb \quad (1)$$
$$= \tfrac{1}{2} Vd \sin \omega t - \tfrac{1}{2} Vd \sin (\omega t - 2\pi/3)$$
$$= \sqrt{3}/2 \, Vd \sin (\omega t + \pi/6)$$

The maximum amplitude vab is an amplitude of 3/2 the DC voltage Vd as shown in FIG. 2(c).

However, if the line voltage can be directly approximated to the sinusoidal wave, then the line voltage vab can output as high as the DC voltage Vd as the maximum amplitude as apparent from FIG. 2(c). However, since the line voltage is determined by the difference between the respective phase potentials, each of the line voltages cannot be singly and simultaneously approximately to the sinusoidal wave. For example, if the a phase potential va and the b phase potential vb are controlled so as to approximate the line voltage vab to the sine wave, then the line voltages vbc and vca are subjected to the influence of the control, whereby the line voltages vbc and vca cannot be approximated to the sinusoidal wave. In consequence, when the triangle interception method is applied, there is no other way than that the phase voltages are turned into the sinusoidal waves so as to indirectly approximate the line voltages to the sinusoidal waves, the maximum amplitude of each of the line voltages can reach 3/2 the original capacity. Therefore, the maximum output of the inverter becomes a value of 3/2 the maximum value of the original output. When a DC power source having a voltage of 2/3 times is prepared in advance in order to control the decrease of the maximum output, such disadvantages are presented that the withstanding voltage of elements used are increased, the capacity of the inverter is increased and the manufacturing cost is raised. Furthermore, since the power source voltage is on-off controlled to be turned into an output voltage for controlling the magnetic flux on the assumption that there is no ripple according to the triangle interception method, there has been presented such a disadvantage that, a ripple, if any, in the DC voltage Vd becomes a ripple in an output voltage and affects the control of the magnetic flux. Because of this, it has become necessary to provide a smoothing circuit of a high capacity on an input section, which proves to be impractical.

Except the above-described method, there is PWM control method in which the primary current is approximated to the sinusoidal wave. However, according to this PWM method, an induction motor uses iron as the core, and there is shown the hysteresis characteristics where the exciting current and the magnetic flux are not in a linear relationship due to non-linear properties of iron as shown in FIG. 3, whereby, even if the primary current is turned into the sinusoidal wave, the magnetic flux $\vec{\lambda}_p$ connected in interlinkage to the motor rotor does not make a uniform rotary motion but a crooked circular motion. Furthermore, according to this method, in order to turn the currents of the respective phases into the sinusoidal waves, the potentials of the respective phases are changed over separately of each other, whereby, to tell in detail, the rotary motion of the magnetic flux consists of a series of modes composed of rotations in the normal direction, rotations in the reverse direction and stops, so that useless loops are formed, thus resulting in increased iron loss of the motor. Additionally, when the induction motor is driven through the control of the primary current, there is presented the disadvantage that, because the impedance of the induction motor is greatly varied due to the slip, the speed control cannot be easily conducted with the arrangement in which no feedback to the rotor speed is made.

The drawback of the control method of the prior art as described above resides in the attempt of turning the voltage or current into the sinusoidal wave so as to indirectly cause the magnetic flux to make a uniform rotary motion.

SUMMARY OF THE INVENTION

The present invention has as its object the provision of method of controlling an inverter capable of obviating the above-described disadvantage of the prior art through the direct control of a vectorial value of the magnetic flux and system therefor.

The present invention contemplates in that a voltage vector is set as on-line so that a deviation between a set value of a reference rotary magnetic flux as being a target and a real value of the magnetic flux can be settled within a tolerance.

The method and system for controlling the inverter according to the present invention is of such an arrangement that rotation of the magnetic flux as being the target of an AC motor under the control is preset as a reference rotary magnetic value, and actual magnetic flux of the AC motor is detected, a deviation is detected between the set reference rotary magnetic flux and the real magnetic flux of the AC motor, and a voltage vector is selected so that the aforesaid deviation can be settled within a tolerance which is set so that rotation of the magnetic flux of the AC motor can be settled within a tolerance for the aforesaid target value.

The method and system for controlling the inverter with the above-described arrangement according to the present invention are advantageous in that the magnetic flux of the AC motor is adapted to be controlled to be directly settled within a tolerance for the target value, whereby the magnetic flux of the AC motor can be directly caused to make a uniform rotary motion without being reduced in the maximum output voltage and affected by the non-linear properties of iron, so that the output voltage can be high and controlling accuracy can be also high, and further, in that iron loss, switching loss and the like are reduced as compared with the conventional example, in which the current is controlled, so that the control efficiency can be improved.

The method and system for controlling the inverter according to the present invention is advantageous in that the method and system are not subjected to the influence of a ripple like the conventional triangle interception method and can conduct the control with high accuracy because, even when the ripple is present in the DC power source, the magnetic flux subjected to the influence of the ripple of the power source voltage is directly detected or voltage vectors containing ripples integrated to calculate the magnetic fluxes and the magnetic fluxes thus calculated are finally controlled to a target magnetic flux.

BRIEF DESCRIPTION OF THE DRAWINGS

FIGS. 16 and 17 are block diagrams showing the examples of the arrangements of the voltage vector selection circuit 8 and the switch ON-OFF data calculation circuit 9;

FIG. 21 is an explanatory view explaining the control vectors illustrated in the embodiment shown in FIG. 18;

FIG. 25 is explanatory views explaining the control vectors illustrated in FIG. 22;

DETAILED DESCRIPTION OF THE INVENTION

Description will now be given of the principle of the present invention.

Firstly, the primary voltage of an AC motor is caught as a voltage vector $\vec{V}_P$ on a vectorial plane represented by the following equation.

$$\vec{V}_p + va = \vec{a}^2 vb = \vec{a}vc \tag{2}$$

where $\vec{a} + e^{j2\pi/3}$

In this case, if the primary voltage of the AC motor is a balanced three-phase voltage, then the following equations will be established.

$$va = \sqrt{2} \, V_1 \cos \omega t \tag{3}$$

$$vb = \sqrt{2} \ V_1 \cos(\omega t - 2\pi/3) \tag{4}$$

$$vc = \sqrt{2} \ V_1 \cos(\omega t - 4\pi/3) \tag{5}$$

$$\vec{V}_P = 3/\sqrt{2} \cdot V_1 \epsilon^{-j\omega t}$$

Figure 1:
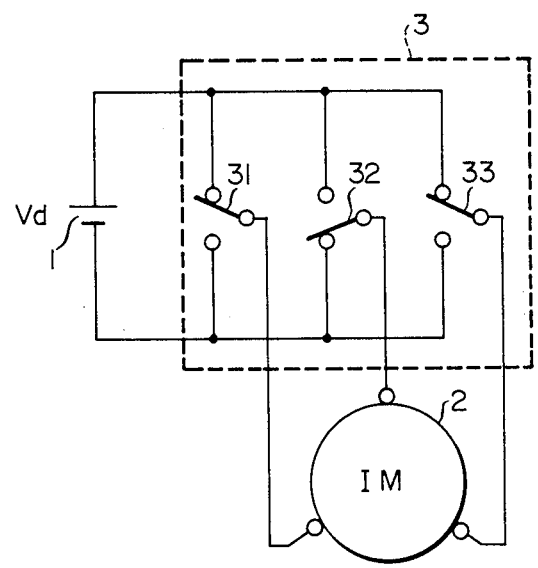
FIG. 1 is a circuit diagram showing the theoretical arrangement of the voltage source inverter for driving the AC motor.
Figure 2:
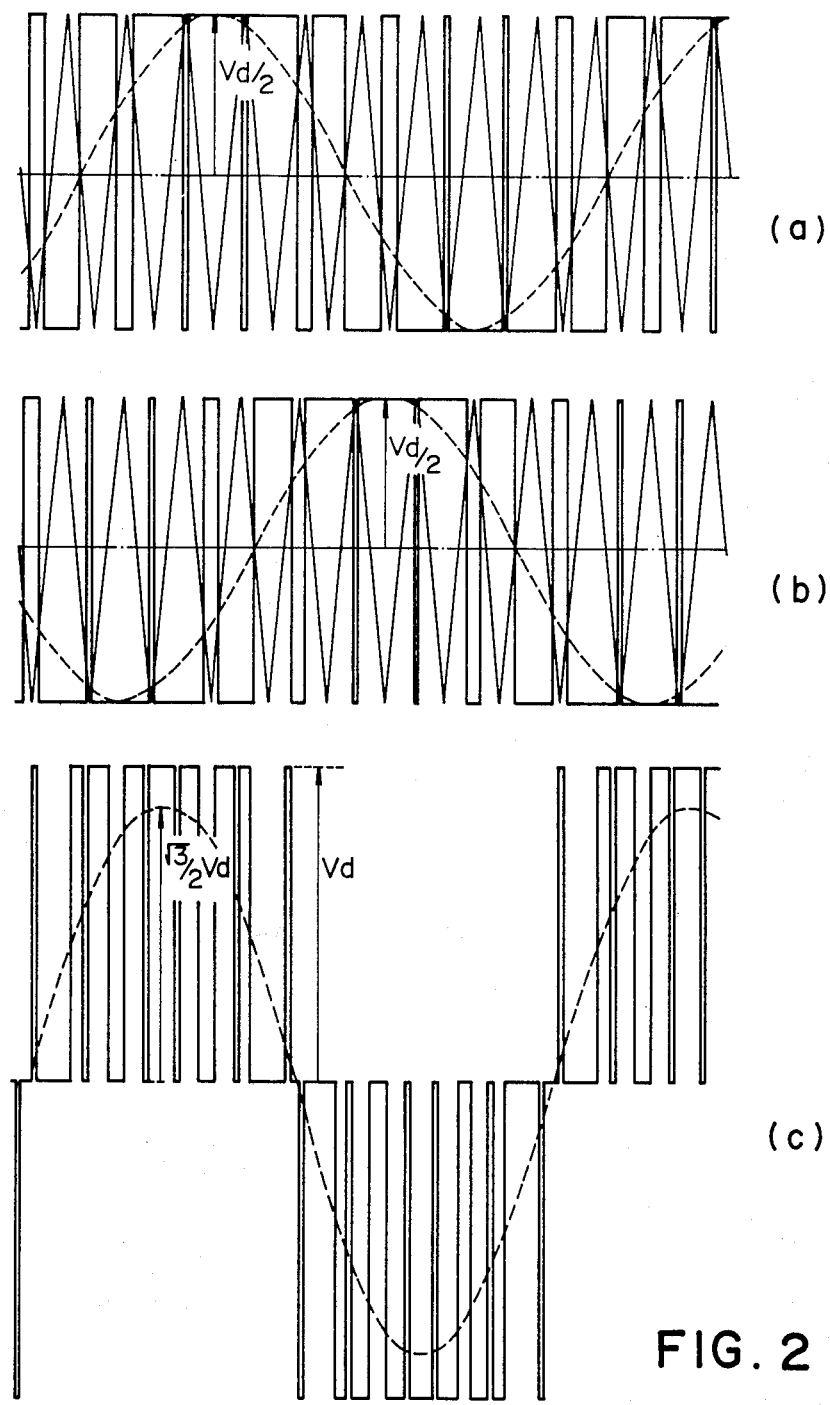
FIG. 2 is control waveform diagrams of the phase voltages and the line voltages for two phases.
Figure 3:
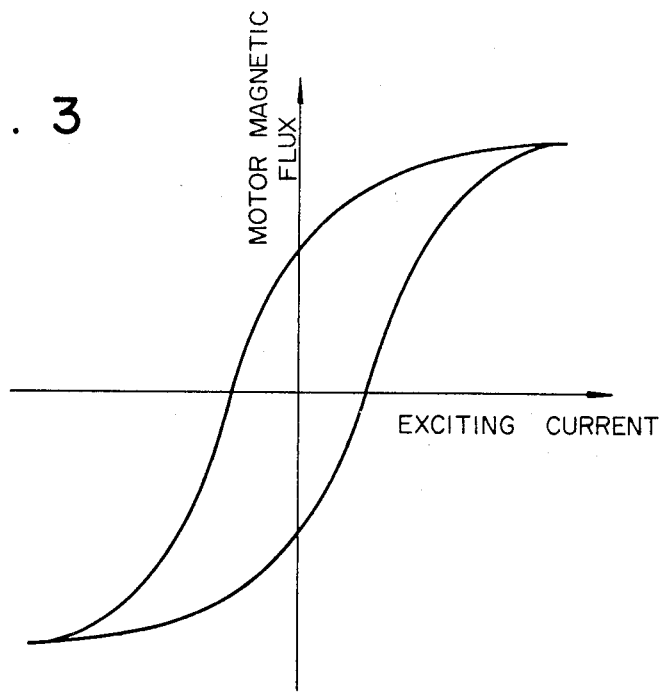
FIG. 3 is a hysteresis characteristic curve diagram showing the non-linear properties of iron.
Figure 4:
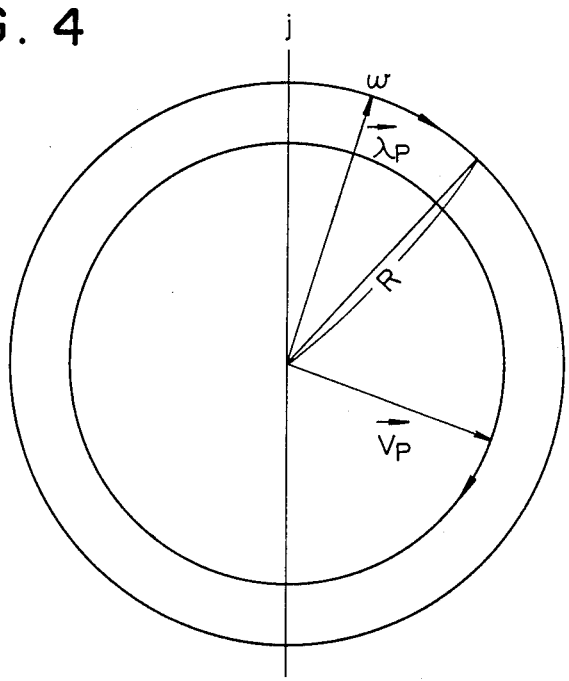
FIG. 4 shows the rotation vectors according to the present invention.

Consequently, the voltage vector $\vec{V}_P$ becomes a rotation vector rotating at an angular velocity $\omega$ and at a constant amplitude in the clockwise direction as shown in FIG. 4.

The magnetic flux $\vec{\lambda}_P$ as being a vectorial value connected in interlinkage to a rotor of the AC motor must be an integrated value with respect to time of a difference of subtraction of an amount of the primary leakage impedance from the aforesaid voltage vector $\vec{V}_P$. However, since the amount of leakage impedance is less than several percent of the primary voltage, the integrated value with respect to time of $\vec{V}_P$ may be regarded as the magnetic flux $\vec{\lambda}_P$ connected in interlinkage to the rotor. In the following equations, the magnetic flux $\lambda_P$ strictly means the magnetic flux linkage.

In that case, the following equation can be established and $\vec{\lambda}_P$ becomes a rotation vector being $\pi/2$ behind $\vec{V}_P$.

$$\vec{\lambda}_P = \int \vec{V}_P dt = 3/\sqrt{2} \cdot \omega \cdot V_1 \epsilon^{-j(\omega t - \pi/2)} \tag{6}$$

When an AC motor is driven by the balanced three phase voltage as described above, a rotation vector is produced, whereby the AC motor may be operated under the most favorable condition.

On the other hand, when the AC motor is driven by an inverter, voltages of eight types (2N, where N=number of inverter switches) in total as shown in the following table can be applied thereto by the a~c phase potentials.

TABLE 1

| | | | | | | | | |
|---|---|---|---|---|---|---|---|---|
| a phase potential | − | + | + | − | − | − | + | + |
| b phase potential | − | − | + | + | + | − | − | + |
| c phase potential | − | − | − | − | + | + | + | + |
| Voltage vector | $\vec{V}_{P0}$ | $\vec{V}_{P1}$ | $\vec{V}_{P2}$ | $\vec{V}_{P3}$ | $\vec{V}_{P4}$ | $\vec{V}_{P5}$ | $\vec{V}_{P6}$ | $\vec{V}_{P7}$ |

Figure 5:
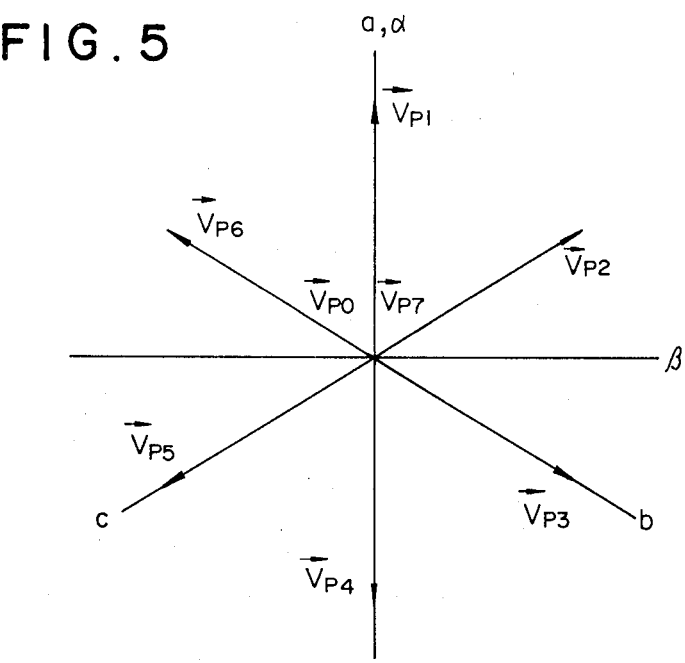
FIG. 5 shows the voltage vectors according to the present invention.

The voltage vectors in this case include voltage vectors of six types $\vec{V}_{Pn}$ (n=1~6) as shown in FIG. 5, $\vec{V}_{P0}$ and $\vec{V}_{P7}$ representing the case where all of the phases are connected to anode or the case all of the phases are connected to cathode, respectively. Here, the values of the voltage vectors of the six types $\vec{V}_{Pn}$ (n=1~6) are proportional to those of an input DC voltage Vd of the inverter, and the directions thereof are identical with those of the axes of coil windings. At this time, an amount of change $\Delta\vec{\lambda}_P$ of $\vec{\lambda}_P$ for a very small period of time $\Delta t$ is represented by the following equation.

$$\Delta\vec{\lambda}_P = \vec{V}_{Pn} \cdot \Delta t \ (n=0~7)$$

Accordingly, when the voltage vectors $\vec{V}_{pn}$ (n=1~6) are selected, $\vec{\lambda}_P$ has a velocity $V_{Pn}$ and a direction $\vec{V}_{Pn}$. In other words, the magnetic flux $\vec{\lambda}_{Pn}$ connected in interlinkage to the rotor moves in six directions corresponding to the axes of coil windings at a velocity proportional to the DC voltage Vd, as far as the primary impedance is neglected. Consequently, when the AC motor is driven by the inverter, the directions, in which the magnetic flux $\vec{\lambda}_P$ move, are limited to six and the velocity is predetermined, so that the magnetic flux $\vec{\lambda}_P$ cannot be turned into an ideal rotary magnetic flux having a given amplitude and a given angular velocity. However, the combination of the voltage vectors $\vec{V}_{Pn}$ in a suitable way makes it possible to control the magnetic flux $\vec{\lambda}_P$ to satisfy the following equation.

$$\vec{\lambda}_P \doteq R \epsilon^{-j\omega t}$$

where R indicates a radius of the circle shown in FIG. 4.

Figure 6:
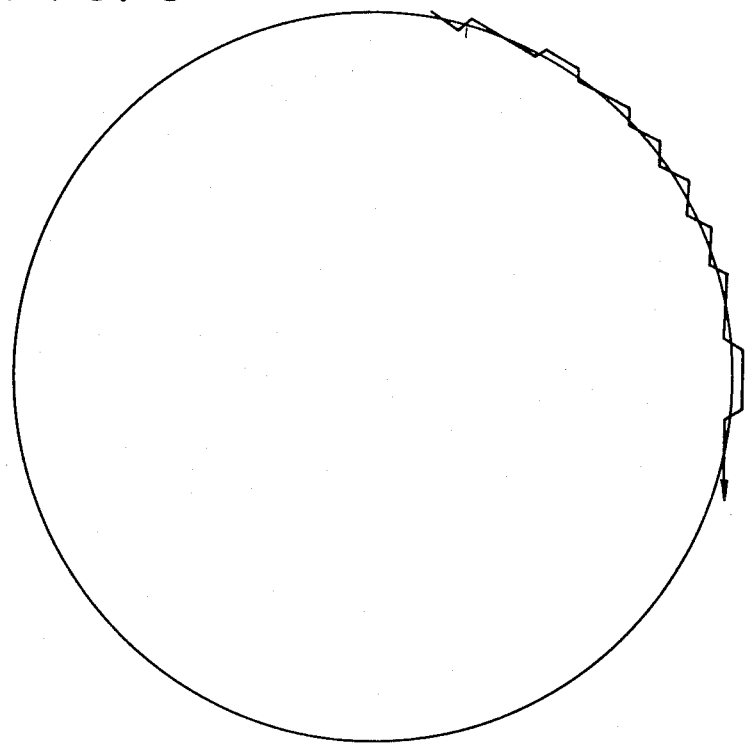
FIG. 6 shows a locus of the magnetic flux according to the present invention.

As shown in FIG. 6 for example, if two voltage vectors close to a tangential line of a circle in a suitable way, then there may be obtained a rotary magnetic flux in which the value $\lambda_P$ of the magnetic flux $\vec{\lambda}_P$ is substantially controlled to a given value. On the other hand, an angular velocity of the magnetic flux cannot be controlled by only two voltage vectors because the magnetic flux $\vec{\lambda}_P$ moves on the locus at a given velocity. However, if a zero factor is selected at a suitable time and for a suitable period of time and the magnetic flux is prevented from rotating, then the angular velocity can be controlled to a mean value.

Therefore, according to the present invention, a reference rotary magnetic flux $\vec{\lambda}_{P0}$ as being the target is determined, an actual magnetic flux $\vec{\lambda}_P$ is detected, the voltage vectors are selected on line, so that a difference therebetween can remain within a tolerance at all times, thus enabling to effect PWM control for satisfying the following equation.

$$\vec{\lambda}_P \doteq \lambda_{P0} \epsilon^{-j\omega t}$$

Additionally, in controlling the value and angular velocity of the magnetic flux $\vec{\lambda}_P$ as described above, the voltage vectors for rotating the magnetic flux in the positive direction are selectively combined with the voltage vectors for rotating the magnetic flux in the negative direction, thus enabling to effect such control. However, since the above-described method tends to increase the iron loss, according to the present invention, to effect such control, there are selected only the zero vectors and the voltage vectors for rotating the magnetic flux in desired directions without fail.

Figure 7:
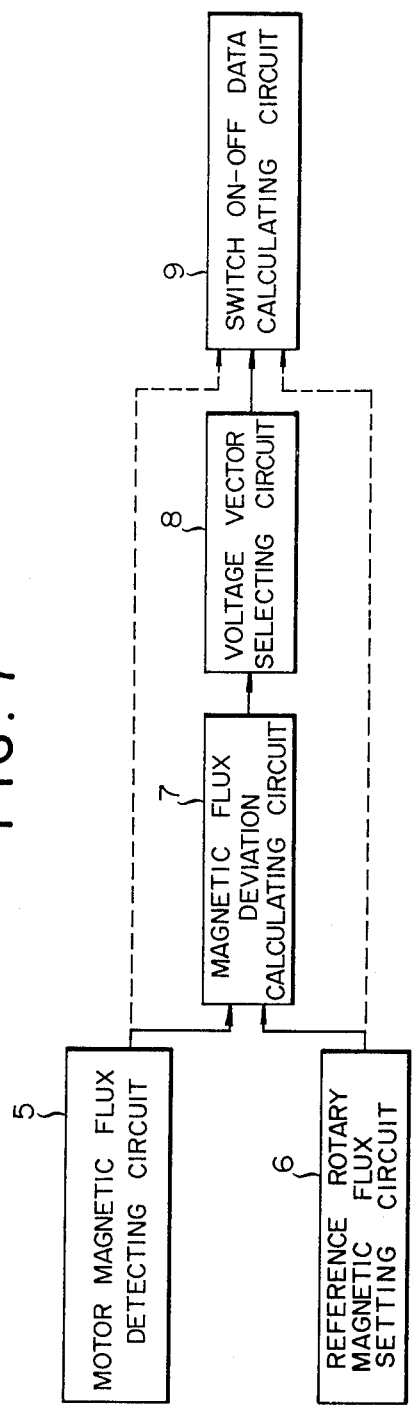
FIG. 7 is a block diagram showing the basic arrangement according to the present invention.

FIG. 7 is a block diagram showing the basic arrangement of the present invention comprising: a motor magnetic flux detecting circuit 5 for detecting the motor magnetic flux; a reference rotary magnetic flux setting circuit 6 for setting a reference rotary magnetic flux $\lambda_{P0}$ as being the target; a magnetic flux deviation calculating circuit 7 for calculating and outputting a magnetic flux deviation between an output value from the reference rotary magnetic flux setting circuit 6 and an output value from the motor magnetic flux detecting circuit 5; a voltage vector selecting circuit 8 for selecting voltage vectors (eight types in this embodiment) which can hold a magnetic flux deviation of an output emitted from the circuit 7 within a tolerance; and a switch on-off data calculation circuit 9 for converting voltage vector data selected by the circuit 8 into actual switch on-off data for the inverter.

In the above-described arrangement, the reference rotary magnetic flux $\vec{\lambda}_{P0}$ as being the target is set by the reference rotary magnetic flux setting circuit 6, the motor magnetic flux $\vec{\lambda}_P$ at present is detected by the motor magnetic flux detecting circuit 5, a deviation $\Delta\vec{\lambda}_P$ between the motor magnetic flux at present and the reference rotary magnetic flux, i.e., a shift from an ideal uniform circular motion is sought, and the voltage vectors are selected by the voltage vector selecting circuit 8 in such a manner that the magnetic flux deviation is held within the tolerance, so that the magnetic flux connected in interlinkage to the rotor of the motor can be progressively approached to the uniform circular motion.

Figure 8:
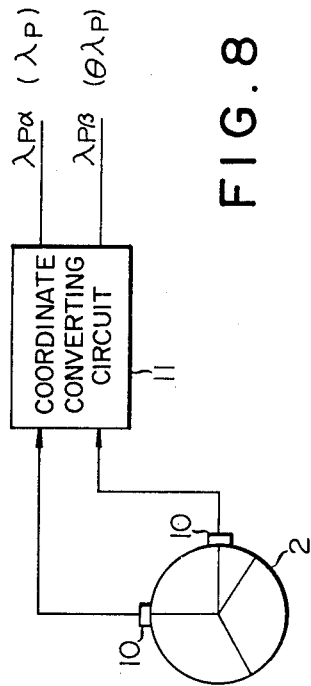
FIG. 8 is a detailed block diagram showing the motor magnetic flux detection circuit 5 illustrated in FIG. 7.
Figure 9:
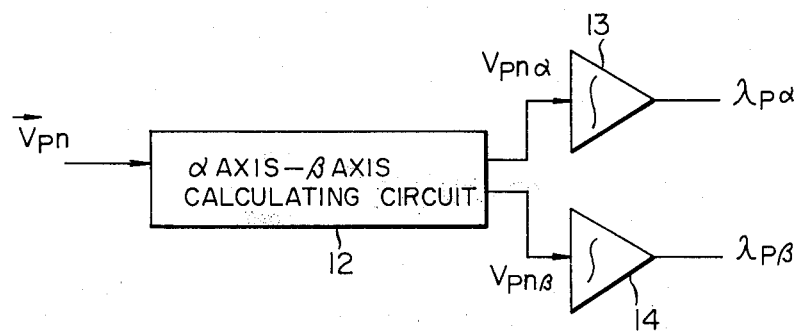
FIGS. 9 and 10 are detailed block diagrams another motor magnetic flux detection circuit 5.

Detailed description will now be given of the circuits, respectively. As shown in FIG. 8, the motor magnetic flux detecting circuit 5 is constructed such that magnetic sensors 10 (or search coils) are secured to a motor 2 for directly detecting data corresponding to the actual magnetic flux. The data thus detected is needed to be converted into a value on a plane of the aforesaid vectors in the motor magnetic flux detecting circuit 5, so that they can be compared with the reference rotary magnetic flux in the magnetic flux deviation calculating circuit 7. As for the coordinate, either rectangular coordinates or polar coordinates are usable. However, when the magnetic flux is directly detected, the application of the rectangular coordinates eliminates necessity for conversion of coordinates, so that the circuit can be simplified. On the other hand, the motor magnetic flux is substantially equal to an integrated value with respect to time of the voltage vector $\vec{V}_{Pn}$. Consequently, when the rectangular coordinates ($\alpha$ and $\beta$) are used, the voltage vector $\vec{V}_{Pn}$ applied to the motor is decomposed into an $\alpha$ axis component $\vec{V}_{Pn}$ and a $\beta$ axis component $\vec{V}_{Pn}$ by a calculation circuit 12 as shown in FIG. 9. When the both components are integrated with respect to time by integrating circuits 13 and 14, results as shown in the following equations will be obtained.

$$\lambda_{P\alpha} = \int V_{Pn\alpha} dt$$

$$\lambda_{P\beta} = \int V_{Pn\beta} dt$$

Thus, an $\alpha$ axis component $\lambda_{P\alpha}$ and a $\beta$ axis component $\lambda_{P\beta}$ of the magnetic flux can be calculated.

Figure 10:
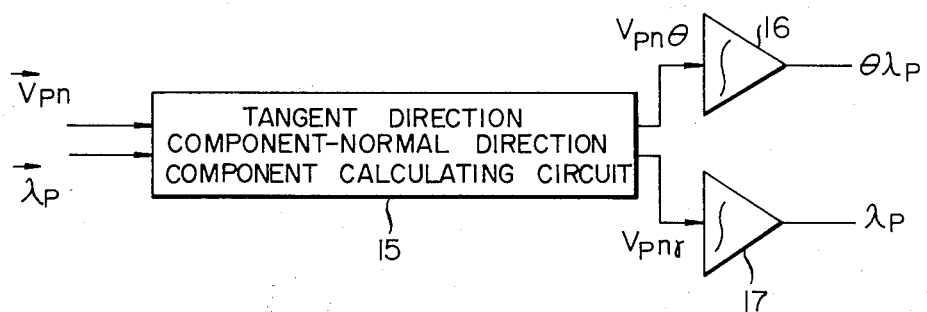

When the polar coordinates (r and $\theta$) are used, the voltage vector $\vec{V}_{Pn}$ applied to the motor is decomposed into a component in the direction of tangential line and a component in the direction of normal line of the magnetic flux $\vec{\lambda}_P$ of the motor as shown in FIG. 10. A component $V_{Pn\theta}$ in the direction of tangential line is divided by the value $\lambda_P$ of the motor magnetic flux in a calculation circuit 15 and a resultant value $V_{Pn\theta}/\lambda_P$ is obtained. When the value $V_{Pn\theta}/\lambda_P$ and a component $V_{Pnr}$ in the direction of normal line are integrated with respect to time in integrating circuits 16 and 17, respectively, results as shown in the following equations will be obtained.

$$\theta\lambda_P = \int V_{Pn\theta}/\lambda_P \cdot dt$$

$$\theta_P = \int V_{Pnr} dt$$

Thus, the value $\lambda_P$ of the motor magnetic flux and an angle of rotation can be detected by the calculation based on the aforesaid equations. Here, calculation of the component $\vec{V}_{Pn\theta}$ in the direction of tangential line and the component $V_{Pnr}$ in the direction of normal line of the voltage vector $\vec{V}_{Pn}$ can be made through the following equations from FIG. 11.

$$V_{Pn\theta} = V_{Pn} \times \sin(\theta V_{Pn} - \theta\lambda_P)$$

$$V_{Pnr} = V_{Pn} \times \cos(\theta V_{Pn} - \theta\lambda_P)$$

As has been described hereinabove, if the motor magnetic flux detecting circuits as shown in FIGS. 9 and 10 are constructed, then such circuits are advantageous in respects of maintenance and economics because the motor magnetic flux can be detected with no sensor being used, thus enabling to simplify the control circuit in arrangement and improve the reliability.

Figure 12:
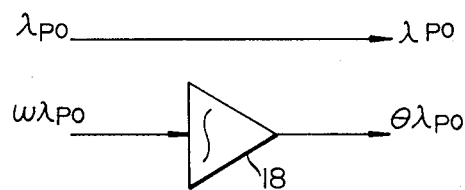
FIGS. 12 and 13 are detailed block diagrams of the reference magnetic flux setting circuit 6 shown in FIG. 7.
Figure 13:
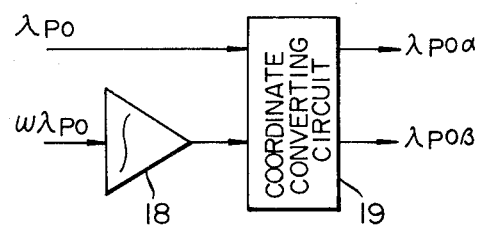

The reference rotary magnetic flux setting circuit 6 has a function of setting a reference rotary magnetic flux $\vec{\lambda}_{P0}$ on the aforesaid vectorial plane in response to a command value i.e. a value of the magnetic flux $\lambda_{P0}$ and an angular velocity of the magnetic flux $\omega\lambda_{P0}$, and serving as a target thereon. To meet the coordinates of the motor magnetic flux detecting circuit 5, the coordinates are constituted by the polar coordinates shown in FIG. 12 or the rectangular coordinates shown in FIG. 13. More specifically, in FIG. 12, $\omega\lambda_{P0}$ is integrated by an integrator 18 to calculate $\theta\lambda_{P0}$, and, in FIG. 13, $\lambda_{P0}$ and $\theta\lambda_{P0}$, which has been integrated by the integrator 18, are converted by a coordinate converting circuit 19 into $\lambda_{P0\alpha}$ and $\lambda_{P0\beta}$, respectively. Additionally, the command value may be any value as far as it can define the reference rotary magnetic flux $\vec{\lambda}_P$ without exception.

The magnetic flux deviation calculating circuit 7 comprises a comparator for calculating a difference $\vec{\lambda}_P - \vec{\lambda}_{P0}$ between the motor magnetic flux data $\lambda_P$ from the motor magnetic flux detecting circuit 5 and the reference rotary magnetic flux data $\vec{\lambda}_{P0}$ from the reference rotary magnetic flux setting circuit 6. The contents of calculation are as follows:

In the case of the rectangular coordinates, $$\Delta\lambda_{P\alpha} = \lambda_{P\alpha} - \lambda_{P0\alpha}$$

$$\Delta\lambda_{P\beta} = \lambda_{P\beta} - \lambda_{P0\beta}$$

and, in the case of the polar coordinates, $$\Delta\lambda_P = \lambda_P - \lambda_{P0}$$

$$\Delta\theta\lambda_P = \theta\lambda_P - \theta\lambda_{P0}$$

Either one of the foregoing equations is calculated, respectively, and a deviation thus obtained is outputted to the voltage vector selecting circuit 8.

The voltage vector selecting circuit 8 is one for successively selecting the voltage vectors so that the deviation between the reference rotary magnetic flux and the motor magnetic flux may not exceed the tolerance. In that case, it is most important for avoiding the increase in iron loss that only the voltage vectors for rotating the motor magnetic flux in the desired direction and a zero vector for stopping the motor magnetic flux are selected with the voltage vectors for rotating the motor magnetic flux in the reversed direction being not selected. It is necessary for improving the motor characteristics that the voltage vectors are frequently changed over so that fluctuations in the magnetic flux may be reduced. However, the switching loss of the inverter increases with the increase in change-over of the voltage vectors. Consequently, it is necessary to select the voltage vectors so that fluctuations in amplitude and fluctuations in rotation of the motor magnetic flux can be effectively controlled with fewer change-overs.

The switch on-off data calculating circuit 9 is one having a function of converting the selected voltage vectorial data into actual switch on-off data of the inverter, and inputs the aforesaid switch on-off data to drivers for switch elements of the inverter, whereby the inverter is operated.

Figure 11:
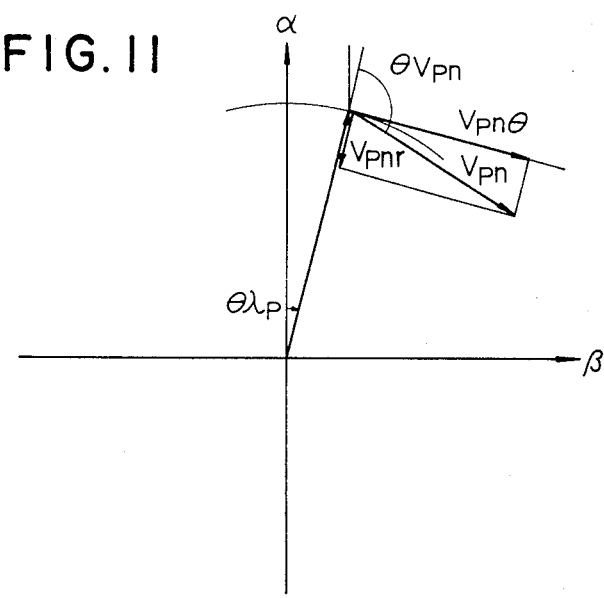
FIG. 11 is an explanatory view illustrating the decomposition in direction of the voltage vector.
Figure 14:
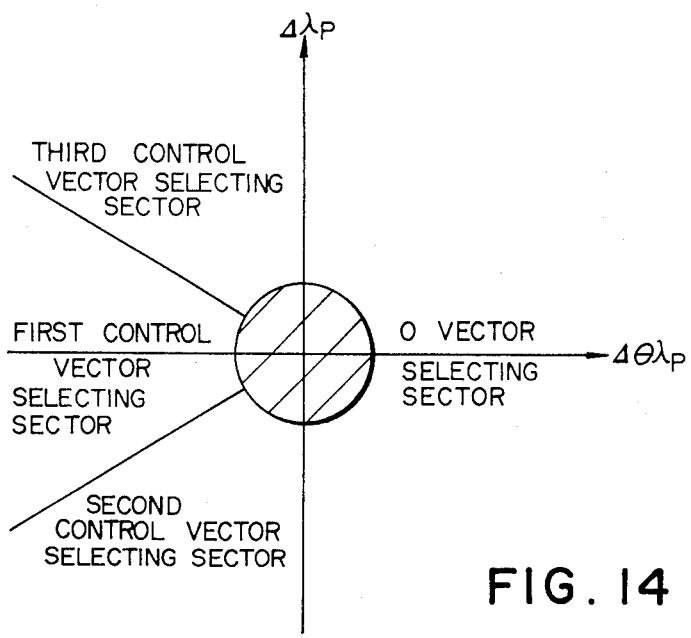
FIG. 14 is an explanatory view explaining the selection of the vector.
Figure 15:
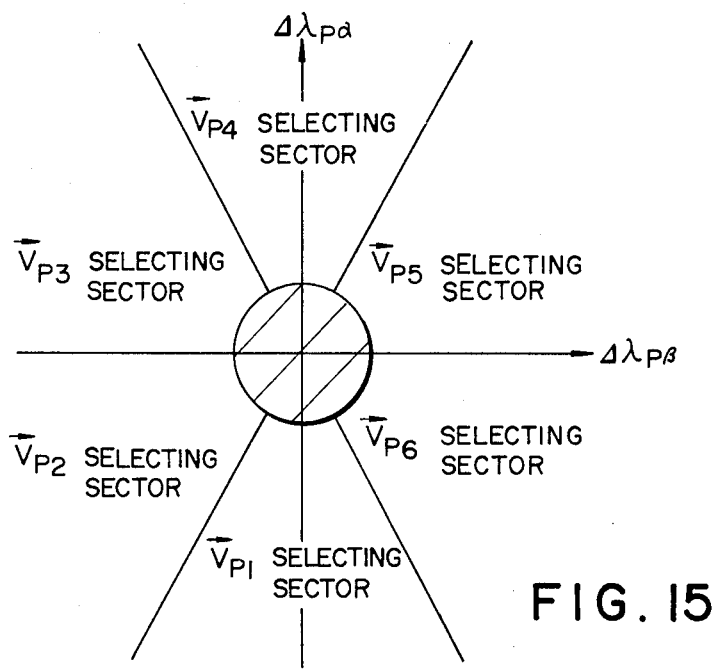
FIG. 15 is an explanatory view explaining the selection of the vector when the magnetic fluxes are treated by the rectangular coordinates.

Description will hereunder be given of the method of selecting the voltage vectors for use in embodiments of the present invention. Out of all the voltage vectors, three voltage vectors capable of rotating the magnetic flux in the desired direction can be selected. For the arrangement shown in FIG. 12 in which the polar coordinates are used, as shown in FIGS. 5 and 11, out of the aforesaid three voltage vectors, a voltage vector closest in direction to the tangential line is defined as a first control vector, a voltage vector located at a position turned through 60° outwardly from the circle as a second control vector, and a voltage vector located at a position through 60° inwardly from the circle as a third control vector. For example, if the direction of tangential line is identical with that shown in FIG. 11, then the voltage vector closest in direction with this direction is $\vec{V}_{P3}$ as apparent from FIG. 5. In consequence, the voltage vector $\vec{V}_{P3}$ becomes the first control vector. In this case, the voltage vector $\vec{V}_{P2}$ located at a position turned through 60° outwardly from the circle in FIG. 11 becomes the second control vector, and the voltage vector $\vec{V}_{P4}$ located at a position turned through 60° inwardly from the circle in FIG. 11 becomes the third control vector. The aforesaid first control vector is the voltage vector for quickly rotating the motor magnetic flux without considerably changing the magnitude of the motor magnetic flux, the aforesaid second control vector is the voltage vector for rotating the magnetic flux with the magnitude of the magnetic flux being increased, and the aforesaid third control vector is the voltage vector for rotating the magnetic flux with the magnitude of the magnetic flux being decreased. Additionally, the aforesaid zero vectors are the voltage vectors for stopping the motor magnetic flux. A tolerance of the deviations $\Delta\theta\lambda_P$ and $\Delta\lambda_P$ or $\Delta\lambda_{P\alpha}$ and $\Delta\lambda_{P\beta}$ of the magnetic flux is indicated by oblique lines about the origin of the rectangular coordinates as shown in FIGS. 14 and 15. In addition, the area other than the tolerance is divided into sectors where the voltage vectors varying in deviation toward the tolerance are unconditionally selected. For example, in the case where the magnetic flux is processed by the polar coordinates, when the arrangement is made as in FIG. 14, even if the deviations $\Delta\theta\lambda_P$ and $\Delta\lambda_P$ are beyond the tolerance, the deviations can become included within the tolerance, because the voltage vectors varying toward the tolerance can be selected.

On the other hand, in the case where the magnetic flux is processed by the rectangular coordinates, when the arrangement is made as in FIG. 15, even if the deviations $\Delta\lambda_{P\alpha}$ and $\Delta\lambda_{P\beta}$ are beyond the tolerance, the deviations can become included within the tolerance, because the voltage vectors varying toward the tolerance can be selected.

In the above-described cases, when the deviations are within the tolerance, the voltage vectors are selected such that, if the deviations $\Delta\theta\lambda_P$ and $\Delta\lambda_P$, or $\Delta\lambda_{P\alpha}$ and $\Delta\lambda_{P\beta}$ are increased in value and become larger than the preset threshold value, then change-over is made to the control vectors for decreasing the deviations or a zero vector.

After the above-described change-over, the deviations are progressively decreased. However, since there is a difference in rotational speed between the actual magnetic flux and the reference rotary magnetic flux, the deviations become increased again from a given time. Therefore, likewise, at a time when the deviations become larger in value than a given threshold value, change-over is made to the control vectors or a zero vector. The aforesaid operation is repeated, whereby the deviations are subjected to a limit cycle, so that the deviations can be held within the tolerance without fail. In addition, in the above-described sequence, the tolerance and the threshold value may be desirably set. It is important for carrying out such control as described above to select only the three control vectors capable of rotating the magnetic flux in the desired direction and a zero vector, so that iron loss may not be increased.

When switching loss of the inverter matters, in order to minimize the increase of switching loss, it is necessary to select the voltage vectors so that fluctuations of the rotary magnetic flux can be effectively controlled by fewer number of commutation.

In switching the voltage vectors, there are three cases including the case where commutation is made in one phase, the case where commutation is made in two phases and the case where commutation is made in all three phases. Consequently, in order to reduce the number of commutation, it is necessary to switch the voltage vectors such that commutation in only one phase will suffice. For example, if the voltage vectors $\vec{V}_{Pn}$ (n=0~7) are divided into two groups including a first group consisting of even number vectors $\vec{V}_{P0}$, $\vec{V}_{P2}$, $\vec{V}_{P4}$ and $\vec{V}_{P6}$ and a second group consisting of odd number vectors $\vec{V}_{P1}$, $\vec{V}_{P3}$, $\vec{V}_{P5}$ and $\vec{V}_{P7}$, then, as apparent from Table 1, commutation in one phase is usually sufficient for the change-over from the odd number vectors to the even number vectors, or from the even number vectors to the odd number vectors. However, the change-over to the voltage vectors different through 180° in direction from the original voltage vectors requires commutation in all three phases.

On the other hand, the change-over from the odd number vectors to the odd number vectors, or from the even number vectors to the even number vectors necessarily requires commutation in two phases. Commutations from phase to phase are accompanied by switching losses, respectively. Consequently, in order to effectively conduct PWM control, it is necessary to reduce the number of commutations as a whole. In consequence, the change-over of the voltage vectors must be conducted from the odd number vectors to the even number vectors, or from the even number vectors to the odd number vectors except in the case where the change-over is conducted to the voltage vectors different through 180° in direction from the original voltage vectors. In order to conduct the above-described control, only the control vectors for rotating the motor magnetic flux in the desired direction and a zero vector should be selected, and further, the odd number vectors and the even number vectors should be alternately selected.

When the magnetic flux is processed by the rectangular coordinates as described above, the voltage vector selecting circuit 8 and the switch on-off data calculating circuit 9 are constructed as shown in FIG. 16, whereby a desired control can be conducted. More specifically, the voltage vector selecting circuit 8 has such a function that the deviations $\Delta\lambda_{P\alpha}$ and $\Delta\lambda_{P\beta}$ are compared with the threshold value in a deviation-threshold value comparing section 81, the voltage vectors are switched on the basis of the data obtained through the comparison in a voltage vector change-over section 82, and voltage vector data $\vec{V}_{Pn}$ is outputted to the switch on-off data calculating circuit 9. The switch on-off data calculating circuit 9 has such a function as to convert the voltage vector data $\vec{V}_{Pn}$ into the switch on-off data in accordance with Table 1.

On the other hand, in the case where the magnetic flux is processed by the polar coordinates, the voltage vector selecting circuit 8 and the switch on-off data calculating circuit 9 may be constructed as shown in FIG. 17.

In the deviation-threshold value comparing section 81 of the voltage vector selecting circuit 8, the deviations $\Delta\theta\lambda_P$ and $\Delta\lambda_P$ are compared with the threshold value, the voltage vectors are switched on the basis of the data obtained through the comparison in the voltage vector change-over section 82, and the control vector data are outputted to the switch on-off data calculating circuit 9.

Here, the control vector data do not directly mean the voltage vector data $\vec{V}_{Pn}$, but are data including the first to third control vectors, zero vectors, even number vectors, odd number vectors and the like. In the switch on-off data calculating circuit 9, the voltage vector data $\vec{V}_{Pn}$ are discriminated on the basis of the aforesaid control vector data and the angle $\theta\lambda_P$ of rotation of the motor flux, or the angle $\theta\lambda_{P0}$ of rotation of the reference rotary magnetic flux, and the switch on-off data are outputted in accordance with Table 1.

Figure 18:
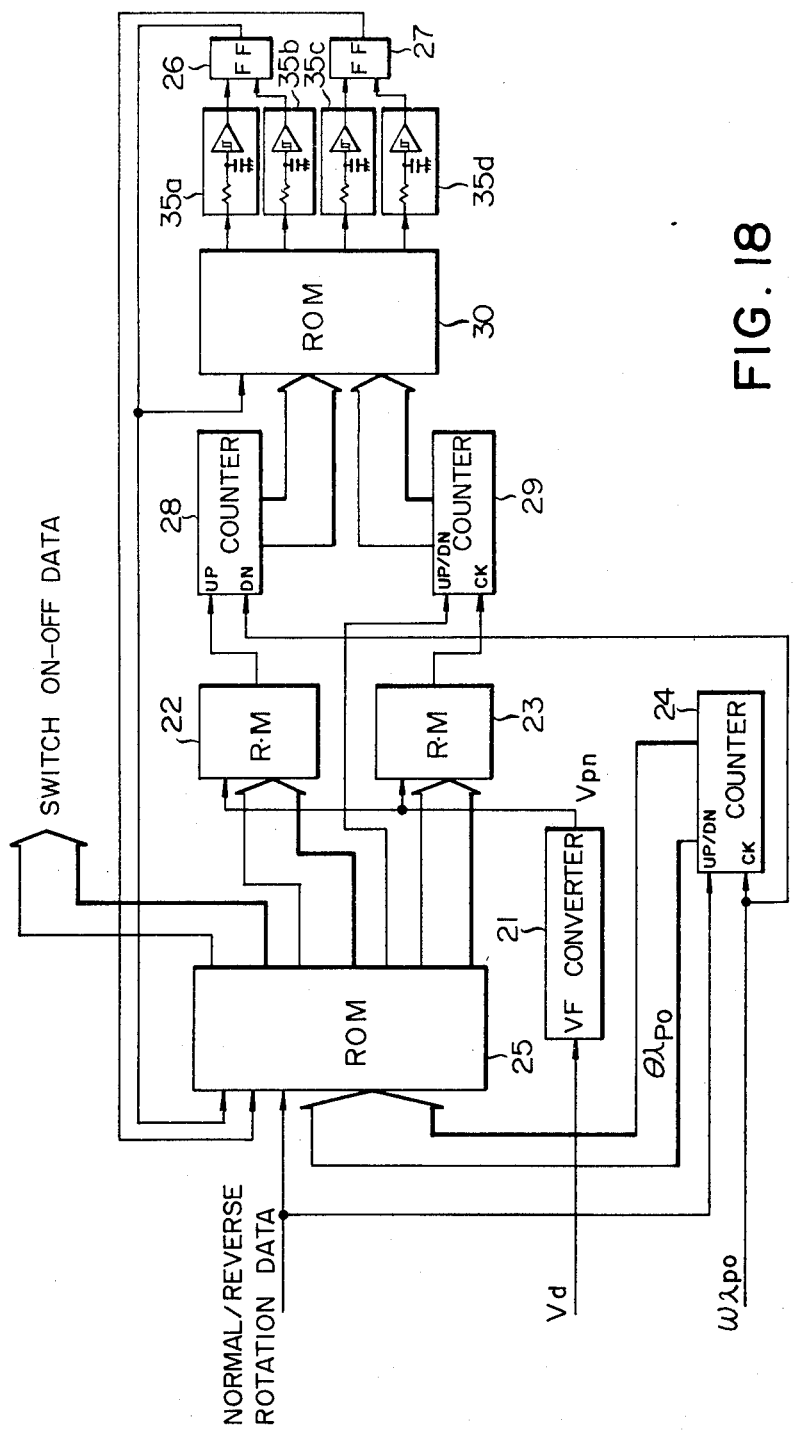
FIG. 18 is a block diagram showing a first embodiment of the present invention.
Figure 19:
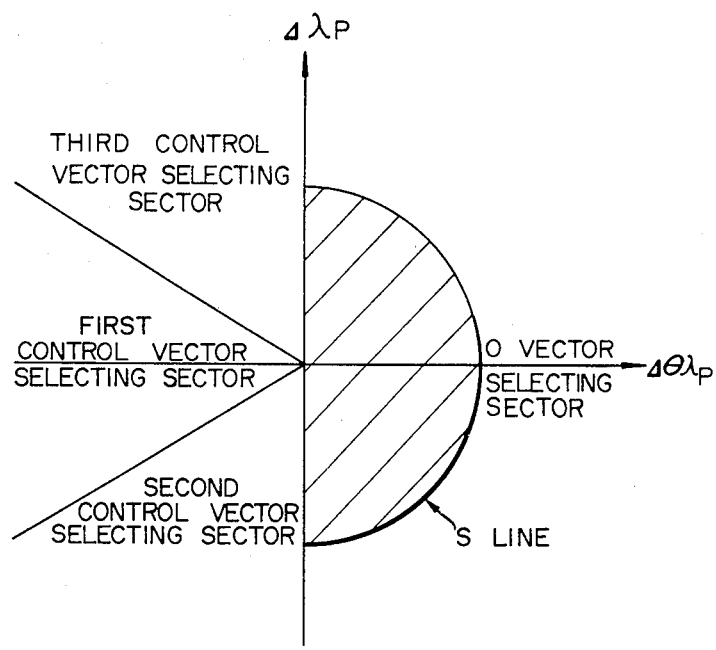
FIG. 19 is an explanatory view explaining the selection of the voltage vector in the embodiment shown in FIG. 18.

FIG. 18 is a block diagram showing the first embodiment of the present invention. According to the present embodiment, even with a DC power source having a multiplicity of voltage ripples, the magnetic flux can be controlled to a constant value. Since the voltage vectors to be selected are control vectors for rotating the magnetic flux in a desired direction and a zero vector, the locus of the magnetic flux does not draw a useless loop, so that iron loss can be reduced. In the present embodiment, the voltage vectors are selected in the following manner. As shown in FIG. 19, a tolerance is set on the coordinates $\Delta\lambda_P$ and $\Delta\theta\lambda_P$, the portion other than the tolerance is divided into sectors for unconditionally selecting control vectors and a zero vector. When the arrangement is made as described above, even if the deviations are beyond the tolerance, the deviations are progressively decreased and included within the tolerance.

When the deviations are within the tolerance, the voltage vectors are selected in the following manner.

Step 1 ... The control vector capable of reducing the deviation $|\Delta\lambda_P|$ is selected. More specifically, when $|\Delta\lambda_P|$ is positive, the third control vector is selected, and, when $\Delta\lambda_P$ is negative, the second control vector is selected. $|\Delta\lambda_P|$ is progressively decreased and, when $|\Delta\lambda_P|$ reaches zero, the process goes forward to Step 2.

Step 2 ... A zero vector is selected. $\Delta\theta\lambda_P$ is progressively decreased and, when $\Delta\theta\lambda_P$ reaches zero, the process goes forward to Step 3.

Step 3 ... The first control vector is selected. The deviation is progressively increased and, when the deviation reaches the threshold value (on the line S in FIG. 19), the process goes forward to Step 1. Additionally, if $|\Delta\lambda_P|$ is small when reaching the threshold value, the period of time for Step 1 becomes small, whereby the process goes back to Step 2.

Figure 20:
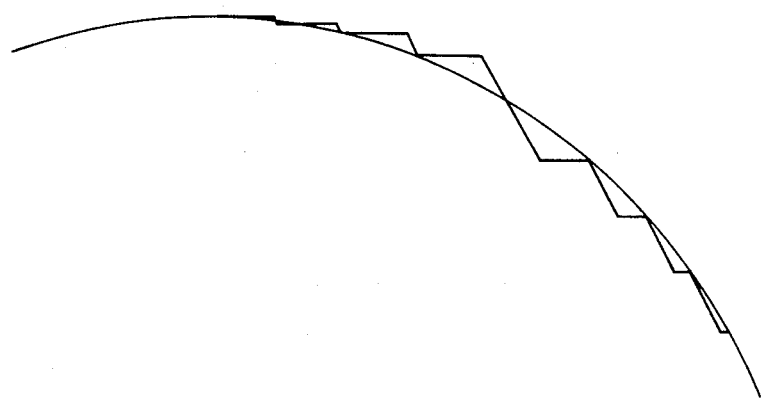
FIG. 20 shows a locus of the motor magnetic flux obtained by the embodiment shown in FIG. 18.

The voltage vectors are selected as described above, the deviations are held within the tolerance, so that the locus of the motor magnetic flux can be as shown in FIG. 20.

The above-described control is effected by a controlling device shown in FIG. 18, which device comprises: a VF converter 21 for converting an analog voltage value into a frequency; rate multipliers (RM) 22 and 23; a counter 24 for calculating an angle $\theta\lambda_{P0}$ of rotation of the reference rotary magnetic flux; a ROM 25 into which constants are written; flip-flop circuit (FF) 26 and 27; counters 28 and 29 for integrating pulse signals applied; a ROM 30 as being a memory; and waveform shaping circuits 35a through 35d.

In the arrangement described above, the VF converter 21 converts an analog signal corresponding to a DC voltage Vd into pulse data and outputs the same to rate multipliers (RM) 22 and 23. The pulse data indicate the magnitude $V_{Pn}$ of the voltage vector. An angular velocity $\omega\lambda_{P0}$ of the reference rotary magnetic flux proportional to the frequency of the inverter being in the form of pulse data is inputted to the counter 24, where the pulse data are integrated, and thereafter, outputted to the ROM 25. Further, in the counter 24, an up action is changed over to a down action due to the normal/reverse rotation data, whereby the rotating direction of the reference rotary magnetic flux is selected.

Normalized components $V_{Pn\theta}/V_{Pn}$ in the tangent direction and absolute values and signs of normalized components $V_{Pnr}/V_{Pn}$ in the normal direction of the control vectors commensurate to the angle $\theta\lambda_{P0}$ of rotation of the reference rotary flux as shown in FIGS. 21(A) and 21(B) are written into the ROM 25. So, when rotational angle data $\theta\lambda_P$ of the reference rotary magnetic flux from the counter 24 and control vector data from the flip-flop circuits (FF) 26 and 27 are inputted to the ROM 25, the ROM 25 can output the normalized component $V_{Pn\theta}/V_{Pn}$ in the tangent direction of the control vector being applied at present to the RM 22, the absolute value of the normalized component $V_{Pnr}/V_{Pn}$ in the normal direction to the RM 23, and the sign thereof to the counter 29. In addition to the aforesaid data, the switch on-off data of the control vectors commensurate to the rotational angle $\theta\lambda_{P0}$ of the reference rotary magnetic flux are written into the ROM 25. Further, the aforesaid data both in the case of the control vectors for rotating the magnetic flux in the normal direction and the case of the control vectors for rotating the magnetic flux in the reverse direction are written in, whereby the switching in directions are made due to the normal/reverse rotation data.

With the above-described arrangement, the control vector data from FF 26 and 27 and the rotational angle data $\theta\lambda_{P0}$ of the reference rotary magnetic flux from the counter 24 are set in the ROM 25, respectively. Further, when the normal/reverse rotation data is inputted, the normalized component $V_{Pn\theta}/V_{Pn}$ in the tangent direction, the absolute value and sign of the normalized component $V_{Pnr}/V_{Pn}$ in the normal direction of the control vector then are instantly outputted to the RM 22, 23 and counter 24, and the switch on-off data corresponding to the set control vector are outputted.

In principle, the component in the tangent direction and the component in the normal direction of the control vector should be calculated on the basis of the rotational angle $\theta\lambda_P$ of the motor magnetic flux at present. However, since the rotational angle $\theta\lambda_P$ of the motor magnetic flux is substantially coincided with the rotational angle of the reference rotary magnetic flux due to this control, $V_{Pnr}/V_{Pn}$ and $V_{Pn\theta}/V_{Pn}$ are determined by $\theta\lambda_{P0}$. The magnitude of the voltage vector $V_{Pn}$ emitted from the VF converter 21 as being in the form of pulse data is inputted into the rate multiplier (RM) 22, and further, the normalized component $V_{Pn\theta}/V_{Pn}$ in the tangent direction of the control vector emitted from the ROM 25 is inputted into the rate multiplier (RM) 22, the former is multiplied by the latter, and $V_{Pn\theta}$ being in the form of pulse data is outputted to an up terminal of the counter 28. On the other hand, the magnitude of the voltage vector $V_{Pn}$ emitted from the VF converter 21 as being in the form of pulse data is inputted into the rate multiplier (RM) 23, and further, the absolute value of the normalized component $V_{Pnr}/V_{Pn}$ in the normal direction of the control vector emitted from the ROM 25 is inputted into the rate multiplier (RM) 23, the former is multiplied by the latter, and $|V_{Pnr}|$ as being pulse data is outputted to the counter 29. In the counter 28, the component $V_{Pn\theta}$ in the tangent direction of the control vector emitted from the RM 22 is inputted to the up terminal, the angular velocity $\omega\lambda_{P0}$ of the reference rotary magnetic flux is inputted to a down terminal, the components and the angular velocities are integrated, respectively, whereby a difference in rotational angle between the motor magnetic flux and the reference rotary magnetic flux, i.e., a deviation $\Delta\theta\lambda_P$ in rotational angle between the magnetic fluxes is calculated, and outputted to the ROM 30. Since the magnitude $\lambda_P$ of the motor magnetic flux is controlled to a substantially constant value by this control, the component $V_{Pn\theta}$ in the tangent direction of the control vector emitted from the RM 22 is commensurate to the angular velocity $\omega\lambda_P$ of the motor magnetic flux. On the other hand, in the counter 29, the absolute value $|V_{Pnr}|$ of the component in the normal direction of the control vector emitted from the RM 23 is inputted into a clock terminal, the sign of $V_{Pnr}$ emitted from the ROM 25 is inputted into an up-down change-over terminal, whereby $|V_{Pnr}|$ is up-counted or down-counted to calculate the deviation $\Delta\lambda_P$ in magnitude of the motor magnetic flux, which is outputted to the ROM 30. In the ROM 30, signals for setting or resetting the flip-flop circuits (FF) 26 and 27 which are emitting control vector data so that the control vector can be selected by the aforesaid method of selecting the voltage vectors are controlled in response to a deviation $\Delta\theta\lambda_P$ in rotational angle of the magnetic flux from the counter 28 and a deviation $\Delta\lambda_P$ in magnitude of the magnetic flux from the counter 29. In order to effect this control, a series of setting data and resetting data should be written in the ROM 30 so that, when the deviation $\Delta\theta\lambda_P$ in rotational angle of the magnetic flux and the deviation $\Delta\lambda_P$ in magnitude of the magnetic flux reach the values at which the control vector should be changed, signals setting or resetting the FF 26 and 27 can be emitted. In order to determine to change the control vector, it is necessary to know at least the data on one bit out of two bits of the control vector data emitted from FF 26 and 27. For this purpose, an output from the FF 26 is inputted to the ROM 30. The waveform shaping circuits 35a through 35d to prevent the effect of hazard are provided between the FF 26, 27 and the ROM 30.

In the above-described embodiment, depending on the fields of application, there are desirably determined the rotational angle $\theta\lambda_{P0}$ of the reference rotary magnetic flux, bit numbers of the normalized component $V_{Pn\theta}/V_{Pn}$ in the tangent direction of the control vector, the absolute value $|V_{Pnr}/V_{Pn}|$ of the component in the normal direction of the control vector and the like, frequencies of pulse data indicating the angular velocity $\omega\lambda_{P0}$ of the reference rotary magnetic flux, of pulse data indicating the magnitude of the voltage vector $V_{Pn}$ and of the like. However, the bit numbers can be increased and the frequencies can be high so as to improve the approximating accuracy.

Further, in the above-described embodiment, the even number vectors and the odd number vectors are not alternately repeated. In consequence, the number of commutations is increased to some extend, however the motor magnetic flux can be approximated to the reference rotary magnetic flux by a very much simplified circuit. In the present embodiment, the motor magnetic flux is directly controlled, whereby the present embodiment is not subjected to the drop in the maximum output voltage as in the triangle interception method or the influence of non-linearity of iron as in the current control. In the present embodiment, since most of the elements are digital, the present embodiment is free from the influences of drift, offset and the like as in the analogue circuits. In the present embodiment, the voltage vectors to be selected include only the control vectors for rotating the magnetic flux in the desired direction and a zero vector, whereby the locus of the magnetic flux does not draw a useless loop and iron loss is decreased. Furthermore, even if the current voltage fluctuates, the velocity of the magnetic flux is calculated in response thereto, so that the present embodiment is applicable to the DC power source including a multiplicity of voltage ripples.

Figure 22:
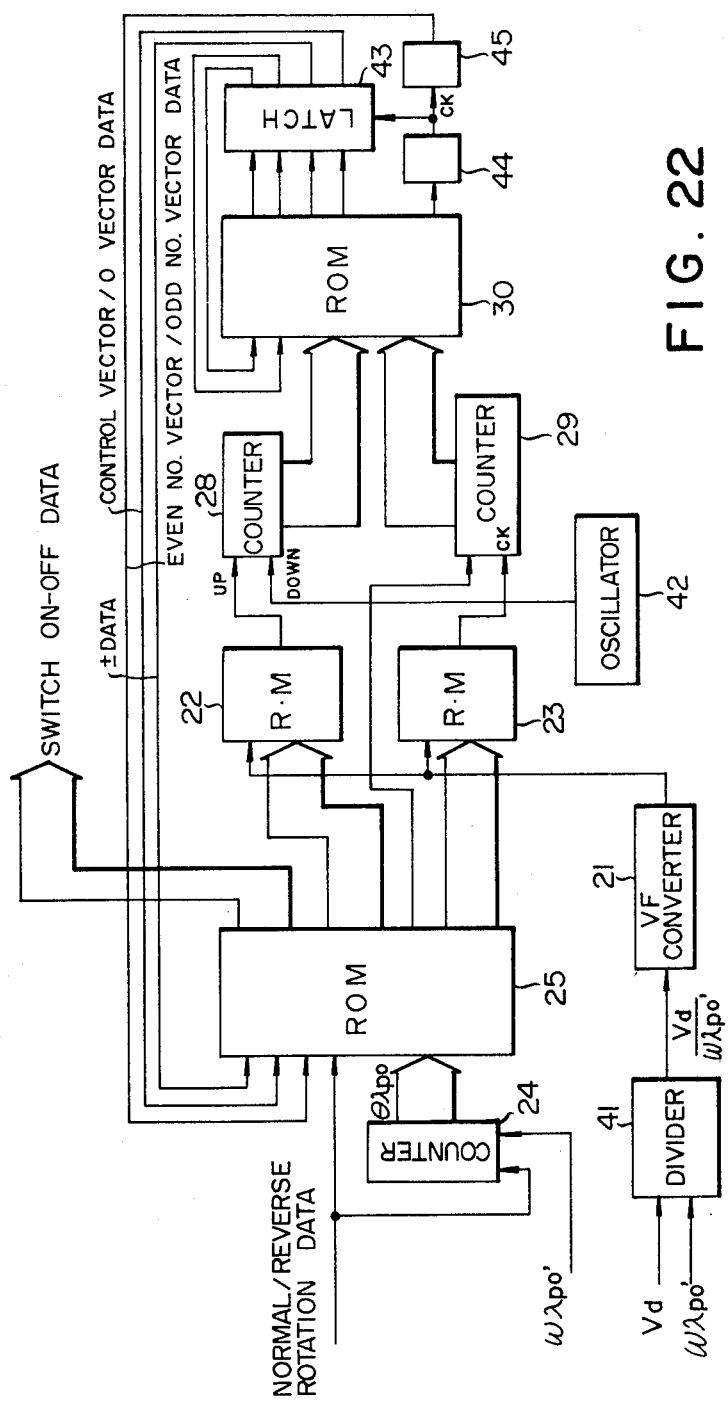
FIG. 22 is a block diagram showing a second embodiment of the present invention.

FIG. 22 is a block diagram showing the second embodiment of the present invention. On the present embodiment, the magnitude of the magnetic flux is held at a constant value against the DC power source including a multiplicity of voltage ripples. Even when the rotational speed is low, the accuracy of approximating the reference rotary magnetic flux is improved in accordance therewith. As for fluctuations in the magnitude of the motor magnetic flux, control is effected such that plus components and minus components are alternately repeated, so that the both components are offset by each other, thus enabling to reduce low fluctuations in magnitude of the magnetic flux. The voltage vectors selected in this case include only the control vectors for rotating the magnetic flux in the desired direction and a zero vector, and, the even number vectors and the odd number vectors are alternately repeated, whereby the iron loss and switching loss are reduced. Additionally, the rotating direction and rotational speed can be desirably set.

Selection of the voltage vectors in the present embodiment is conducted in the following manner.

Figure 23:
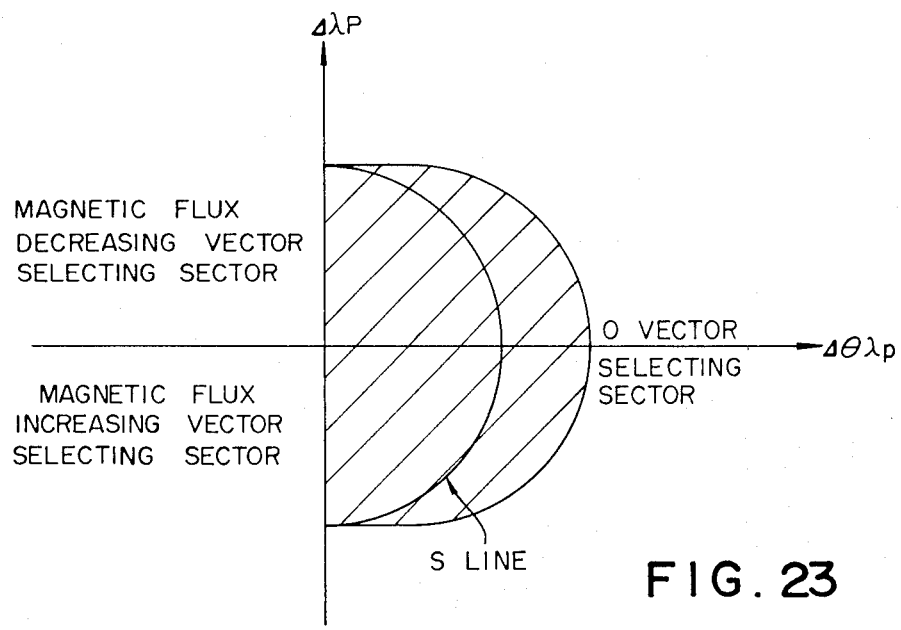
FIG. 23 is an explanatory view explaining the selection of the voltage vectors in the embodiment shown in FIG. 22.

A tolerance is set on the coordinates of $\Delta\lambda_P$ and $\Delta\theta\lambda_P$ in FIG. 23, the portion other than the tolerance is divided into sectors for unconditionally selecting control vectors and a zero vector. In FIG. 23, a magnetic flux increasing vector means a control vector for rotating the magnetic flux in the desired direction, while increasing in magnitude of the magnetic flux, and a magnetic flux decreasing vector means a control vector for rotating the magnetic flux, while decreasing in magnitude of the magnetic flux.

As apparent from FIG. 21, the second control vector corresponds to the magnetic flux increasing vector, the third control vector corresponds to the magnetic flux decreasing vector, and the first control vector may be either the magnetic flux increasing vector or the magnetic flux decreasing vector as commensurate to the rotational angle of the magnetic flux. In consequence, when the arrangement is made as in FIG. 23, even if deviations are present at the portion other than the tolerance, the deviations are progressively decreased and enter the tolerance. In the present invention, when the deviations are within the tolerance, the voltage vectors are selected in the following manner.

Step 1 . . . A control vector as being the even number vector is selected, and the sign of $\Delta\theta_P$ at this time is stored. When there are two even number vectors, the even number vector which decreases $|\Delta\lambda_P|$ is selected. More specifically, when $\Delta\lambda_P$ is of a positive value, the even number vector as being the magnetic flux decreasing vector is selected, and, when $\Delta\lambda_P$ is a negative value, the even number vector as being the magnetic flux increasing vector is selected. $|\Delta\lambda_P|$ is progressively decreased, and, when $|\Delta\lambda_P|$ reaches zero, the process goes forward to Step 2. In addition, when the deviation goes out of the tolerance before $|\Delta\lambda_P|$ reaches zero, the process goes forward to Step 2 then.

Step 2 . . . The zero vector as being the odd number vector is selected. $\Delta\theta\lambda_P$ is progressively decreased, and, when $\Delta\theta\lambda_P$ reaches zero, the process goes forward to Step 3.

Step 3 . . . The control vector as being the even number vector is selected. When there are two even number vectors, if the sign of $\Delta\lambda_P$ which has been stored is positive, then the even number vector as being the magnetic flux decreasing vector is selected, and, if the sign is negative, then the even number vector as being the magnetic flux increasing vector is selected. The deviation is progressively increased, and, when the deviation reaches the threshold value (on the S Line in FIG. 23), the process goes forward to Step 4.

Step 4 . . . The control vector as being the odd number vector is selected, and the sign of $\Delta\lambda_P$ at this time is stored. When there are two odd number vectors, the odd number vector for decreasing $|\Delta\lambda_P|$ is selected. More specifically, when the sign of $\Delta\lambda_P$ is positive, the odd number vector as being the magnetic flux decreasing vector is selected, and, when the sign of $\Delta\lambda_P$ is negative, the odd number vector as being the magnetic flux increasing vector is selected. $|\Delta\lambda_P|$ is progressively decreased, and, when $|\Delta\lambda_P|$ reaches zero, the process goes forward to Step 5. In addition, when the deviation goes out of the tolerance before $|\Delta\lambda_P|$ reaches zero, the process goes forward to Step 5 then.

Step 5 . . . The zero vector as being the even number is selected. $\Delta\theta\lambda_P$ is progressively decreased, and, when $\Delta\theta\lambda_P$ reaches zero, the process goes forward to Step 6.

Step 6 . . . The control vector as being the odd number vector is selected. When there are two odd number vectors, if the sign of $\Delta\lambda_P$ which has been stored is positive, then the odd number vector as being the magnetic flux decreasing vector is selected, and, if the sign is negative, then the odd number vector as being the magnetic flux increasing vector is selected. The deviation is progressively increased, and, when the deviation reaches the threshold value (on the S Line in FIG. 23), the process goes back to Step 1.

Figure 24:
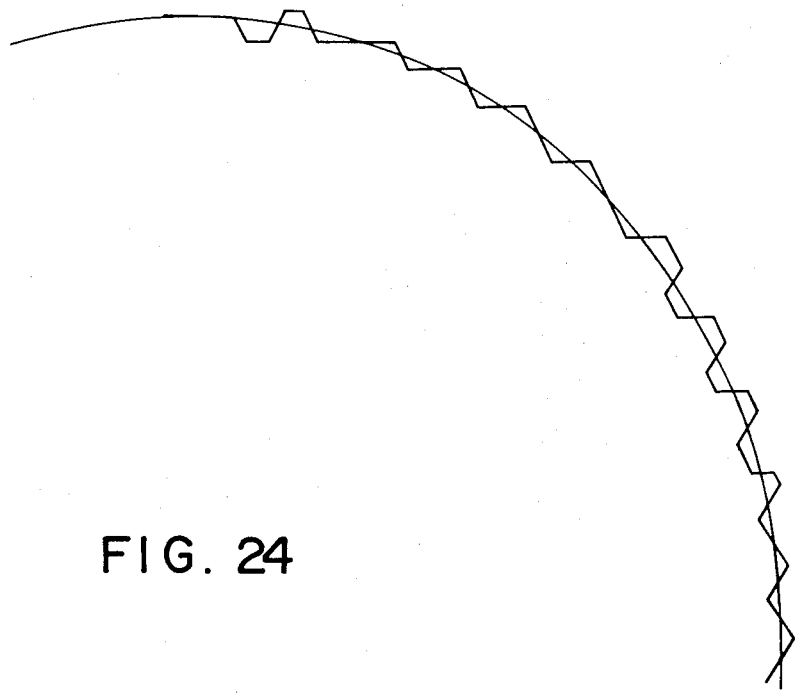
FIG. 24 shows a locus of the motor magnetic flux obtained by the embodiment shown in FIG. 22.

The voltage vectors are selected as described above, whereby the deviations remain within the tolerance, so that locus of the motor magnetic flux can be drawn as in FIG. 24.

The above described controls are effected by a control system as shown in FIG. 22. In FIG. 22, same reference numerals as shown in FIG. 18 are used to designated same or similar parts, and description thereof is simplified avoiding overlapping of description. The arrangement from the ROM 25 to the ROM 30 in this embodiment is similar to the arrangement shown in FIG. 18. The control system shown in FIG. 22 differs from that shown in FIG. 18 in that: a divider 41 is provided in front of the VF converter 21; an oscillator 42 is provided for applying down signals to the counter 28; a latch circuit 43, a waveform shaping circuit 44 and a binary counter 45 are provided on the output side of the ROM 30, respectively; the waveform shaping circuits 35a through 35d and FF 26, 27 are removed.

In the above-described arrangement, the DC voltage Vd and the angular velocity $\omega\lambda_{P0'}$ of the reference rotary magnetic flux are inputted to the divider 41, which outputs the result of division $Vd/\omega\lambda_{P0'}$ to the VF converter 21. In the VF converter 21, the analog signal $Vd/\omega\lambda_{P0'}$ is converted into pulse data, which are outputted to RM 22 and 23. In this embodiment, the aforesaid $Vd/\omega\lambda_{P0'}$ is treated as the magnitude of the voltage vector $V_{Pn}$. This embodiment differs from the first embodiment in that the magnitude of the voltage vector $V_{Pn}$ is divided by the angular velocity of the reference rotary magnetic flux. Inputted to the counter 24 is the angular velocity $\omega\lambda_{P0}$ of the reference rotary magnetic flux in the form of pulse signals, which are integrated to calculate the rotational angle $\theta\lambda_{P0}$ of the reference rotary magnetic flux, which is outputted to the ROM 25. In addition, an up action or down action of the counter 24 is changed over to each other by the normal/reverse rotation data, whereby the rotating direction of the reference rotary magnetic flux is selected. Inputted to the ROM 25 is the angle of rotation $\theta\lambda_{P0}$ of the reference rotary magnetic flux from the counter 24, the control vector data from the latch 43 and the binary counter 45, and the normal/reverse rotation data. The control vector data in this embodiment are formed on the basis of the even number vector/odd number vector data from the binary counter 45, the control vector/zero vector data from the latch 43, and the sign $+/-$ data of $\Delta\lambda_P$ sign data stored in Step 1 and 4, respectively, so that the voltage vectors can be selected as described above. When the aforesaid data are inputted to the ROM 25, the ROM 25 previously writes thereinto the normalized component $V_{Pn\theta}/V_{Pn}$ in the tangential direction of the control vectors commensurate to the angle of rotation $\theta\lambda_{P0}$ of the reference rotary magnetic flux as shown in FIGS. 25(A) and 25(B), the absolute value $|V_{Pnr}/V_{Pn}|$ of the normalized component in the normal direction and the sign thereof, so that the ROM 25 can output the normalized component in the tangential direction $V_{Pn\theta}/V_{Pn}$ of the control vector being applied at present to the RM 22, the absolute value $|V_{Pnr}/V_{Pn}|$ of the normalized component in the normal direction to the RM 23 and the sign thereof to the counter 29. Furthermore, the ROM 25 previously writes thereinto switch on-off data of the control vectors commensurate to the angle of rotation $\theta\lambda_{P0}$ of the reference rotary magnetic flux in addition to the above-described data. In addition, in the above-described data, there are written in the case of the control vector for rotating the magnetic flux in the normal direction and the case of the control vector for rotating the magnetic flux in the reverse direction, respectively. There two cases are changed over to each other by the normal/reverse rotation data.

When the control vector data, the angle $\theta\lambda_{P0}$ of rotation of the reference rotary magnetic flux and the normal/reverse rotation data are set in the ROM 25, respectively, as described above, the normalized component $V_{Pn\theta}/V_{Pn}$ in the tangential direction of the control vector at this time, the absolute value $|V_{Pnr}/V_{Pn}|$ of the normalized component in the normal direction and the sign thereof are instantaneously outputted to the RM 22, 23 and the counter 29, and further, the switch on-off data commensurate to the set control vector are outputted. In principle, the component in the tangent direction and the component in the normal direction of the control vector should be calculated on the basis of the rotational angle $\theta\lambda_P$ of the motor magnetic flux at present. However, since the rotational angle $\sigma\lambda_P$ of the motor magnetic flux is substantially coincided with the rotational angle of the reference rotary magnetic flux due to this control, $V_{Pnr}/V_{Pn}$ and $V_{Pn\theta}/V_{Pn}$ are determined by $\theta\lambda_{P0}$. Inputted to the RM 22 are the magnitude $V_{Pn}$ of the voltage vector outputted from the VF converter 21 in the form of pulse data and the normalized component $V_{Pn\theta}/V_{Pn}$ in the tangential direction of the control vector from the ROM 25. The both inputs are multiplied by each other to obtain the result $V_{Pn\theta}$, which is outputted to the up terminal of the counter 28 in the form of a pulse signal. Furthermore, inputted to the RM 23 are the magnitude $V_{Pn}$ of the voltage vector outputted from the VF converter 21 in the form of a pulse signal and the absolute value $|V_{Pnr}/V_{Pn}|$ of the normalized component in the normal direction of the control vector from the ROM 25. The both inputs are multiplied by each other to obtain the result $|V_{Pnr}|$, which is outputted to the counter 29 in the form of a pulse signal.

The counter 28 has such a function as to up-count the angular velocity $\omega\lambda_P$ of the motor magnetic flux and down-count the angular velocity of the reference rotary magnetic flux, respectively whereby a difference between the angles of rotation of the motor magnetic flux and the reference rotary magnetic flux, i.e., a deviation $\Delta\theta\lambda_P$ in angle of rotation of the magnetic flux is calculated and outputted to the ROM 30. Inputted to the up terminal is the component $V_{Pn\theta}$ in the tangential direction of the control vector from the RM 22. Since the magnitude $V_{Pn}$ of the voltage vector is substituted by the value $Vd/\omega\lambda_{P0'}$ which has been obtained by dividing the DC voltage $Vd$ by the angular velocity $\omega\lambda_{P0'}$, this component $V_{Pn\theta}$ in the tangential direction of the control vector corresponds to the value $(V_{Pn\theta}/\omega\lambda_{P0'})$ which is proportional to a value obtained by dividing the actual value $V_{Pn\theta'}$ by $\omega\lambda_{P0'}$. On the other hand, inputted to the down terminal of the counter 28 is the angular velocity $\omega\lambda_{P0}$ of the reference rotary magnetic flux. However, similarly to the above it is necessary to input to the down terminal the value divided by the angular velocity $\omega\lambda_{P0'}$ of the reference rotary magnetic flux, and hence, the angular velocity $\omega\lambda_{P0}$ inputted to the down terminal becomes a pulse signal having given frequencies. For this, the angular velocity $\omega\lambda_{P0}$ of the reference rotary magnetic flux is fed to the down terminal by the oscillator 42 generating given frequencies. Since the magnitude of the motor magnetic flux $\lambda_P$ is controlled to a given level by this control, the component $V_{Pn\theta}$ in the tangent direction of the control vector inputted from the RM 22 corresponds to the angular velocity $\omega\lambda_P$ of the motor magnetic flux. On the other hand, in the counter 29, the absolute value $|V_{Pnr}|$ of the component in the normal direction of the control vector is inputted to a clock terminal from the RM 23, the sign of $V_{Pnr}$ is inputted to an up-down change-over terminal from the ROM 25, and $|V_{Pnr}|$ is up-counted or down-counted to calculate the deviation $\Delta\lambda_P$ of the motor magnetic flux and outputted to the ROM 30.

The ROM 30 controls input data inputted to the latch 43 outputting the control vector data in such a manner that the control vector is selected by the method of selecting the voltage vectors as described above, and a clock signal inputted to the binary counter 45, in accordance with a deviation $\Delta\theta\lambda_P$ of the angle of rotation of the magnetic flux from the counter 28 and a deviation in magnitude of the magnetic flux from the counter 29. In order to effect this control, when the deviation between the deviation $\Delta\theta\lambda_P$ in angle of rotation of the magnetic flux as being the input signal and the deviation in magnitude of the magnetic flux reaches a value where the control vector is to be changed, the control vector data to be subsequently selected should be outputted to the latch and the clock signal should be outputted to the latch 43 so that the latch 43 can store such data. Then, in the ROM 30, there are stored a series of control vector data (the control vector/zero vector data, and the sign $+/-$ data of $\Delta\lambda_P$) and the clock data. The even number vector/odd number vector data of the control vector data are obtained such that the clock signal outputted to the latch 43 when the control vector is changed is binary-counted.

In order to determine the change of the control vector, it is necessary to learn which Step is under way in the method of selecting the aforesaid voltage vectors. In consequence, in the ROM 30, the Step data is outputted to the latch 43, and the Step data thus stored by the latch 43 is fed back to the ROM 30. In addition, except for the difference in use of either even number vectors or the odd number vectors, processing of Steps 1 through 3 and that of Steps 4 through 6 are similar to each other, whereby the Step data consists of two bits. Further, to avoid the influence of hazard, the clock signal is obtained such that an output from the ROM 30 is temporarily fed to the waveform shaping circuit 44.

In this embodiment, similarly to the case of the first embodiment, depending on the field to be applied, there may be desirably set the bit numbers of the angle $\theta\lambda_{P0}$ of rotation of the reference rotary magnetic flux, of the normalized component in the tangential direction $V_{Pn\theta}/V_{Pn}$ of the control vector, of the absolute value $|V_{Pnr}/V_{Pn}|$ of the component in the normal direction, of the deviation $\Delta\lambda_P$ in magnitude of the deviation $\Delta\theta\lambda_P$ in angle of rotation of the magnetic flux, etc., the frequencies of the angular velocity $\omega\lambda_{P0}$ of the reference rotary magnetic flux and the magnitude of the voltage vectors, $V_{Pn}$ etc. Furthermore, the bit number is increased and the frequencies are raised, so that the approximating accuracy can be improved.

The embodiment shown in FIG. 22 enables to obtain the result similar to that of the embodiment shown in FIG. 18, and moreover, is advantageous in that the voltage vectors are selected such that the even number vectors and the odd number vectors are alternately repeated, so that the number of commutation can be decreased and the switching loss can be reduced. The approaching accuracy is given as a value proportional to a value dividing the variation $\Delta\theta\lambda_P$ in angle of rotation of the magnetic flux and the deviation $\Delta\lambda_P$ in magnitude of the magnetic flux by the angular velocity $\omega\lambda_{P0}$ of the reference rotary magnetic flux, so that the approximating accuracy can be improved in the low speed region where the torque ripple matters, thereby enabling to show satisfactory characteristics. Furthermore, the deviation $\Delta\lambda_P$ in magnitude of the motor magnetic flux is controlled such that the plus components and the minus components are alternately repeated, whereby the both components offset by each other, so that the fluctuation in magnitude of the magnetic flux of low order can be reduced. Further, the speed of the magnetic flux is calculated on the basis of the fluctuations of the DC voltage, so that the present invention is applicable to the DC power source including many voltage ripples. Additionally, the system is formed of digital circuits, so that the system can avoid the adverse effects from the drift, offset and the like as in the analogue circuits.

Figure 26:
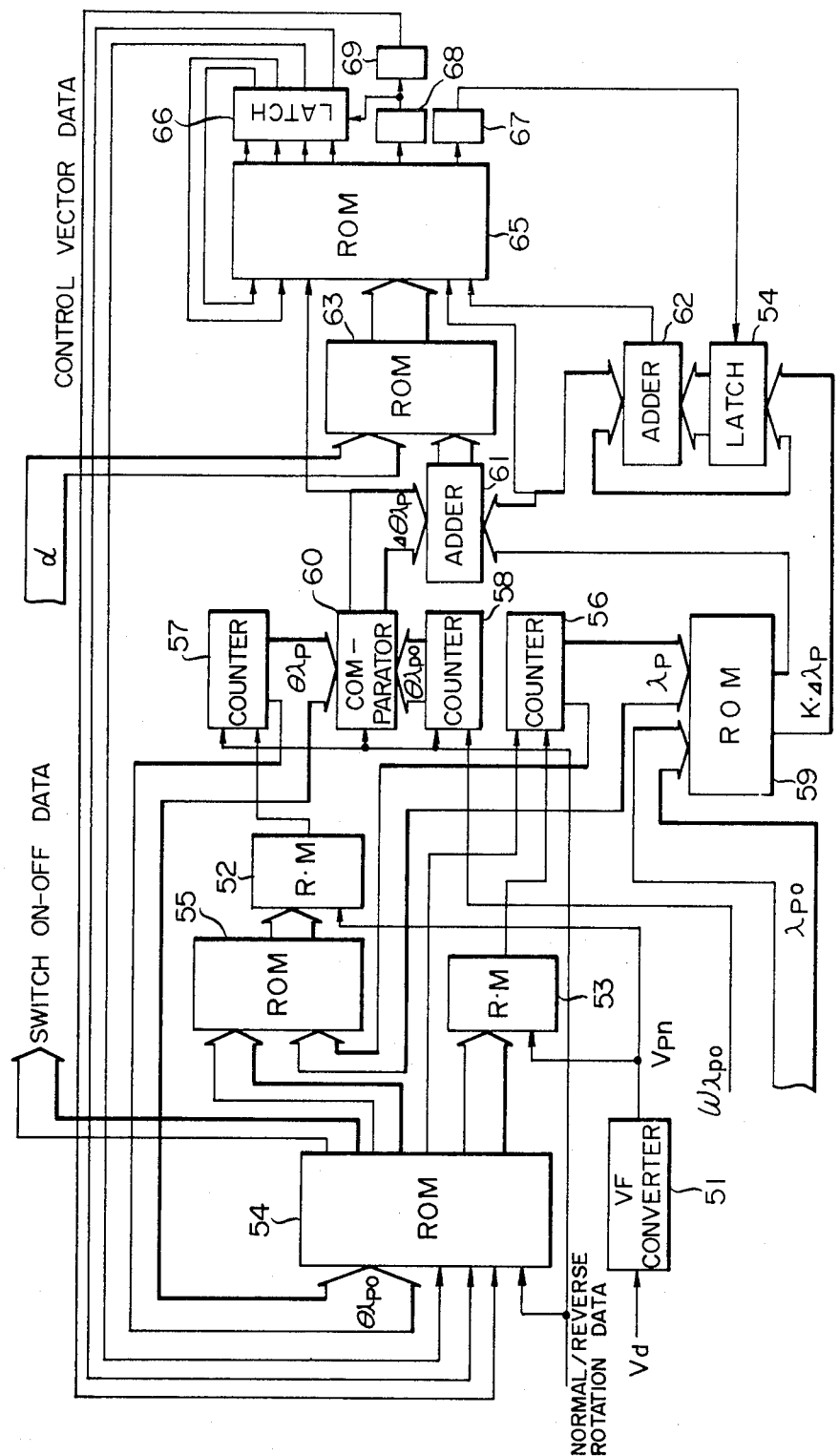
FIG. 26 is a block diagram showing a third embodiment of the present invention.

FIG. 26 is a block diagram showing the third embodiment of the present invention. In this embodiment, the motor magnetic flux can be made to approximate the reference rotary magnetic flux having a desirable magnitude and a desirable rotational speed without being subjected to the adverse effects from the DC power source including many voltage ripples, and moreover, the approximating accuracy can be desirably changed depending upon the operating conditions.

Figure 27:
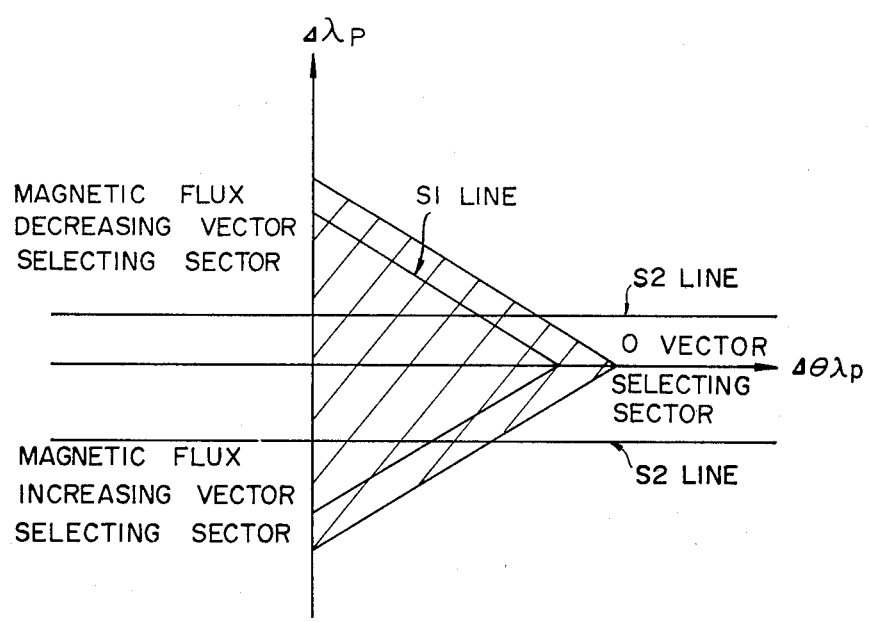
FIG. 27 is an explanatory view explaining the selection of the voltage vectors in the embodiment shown in FIG. 26.

In this embodiment, the voltage vectors are selected in the following manner. As shown in FIG. 27, a tolerance is set on the coordinates $\Delta\lambda_P$ and $\Delta\theta\lambda_P$, the portion other than the tolerance is divided into sectors for unconditionally selecting control vectors and a zero vector. When the sectors are set as shown in FIG. 27, even if the deviation is present beyond the tolerance, the deviation is progressively decreased and goes into the tolerance as in the second embodiment. When the deviation is within the tolerance, the voltage vector is selected in the following manner.

Step 1 ... The control vector as being the even number vector is selected, and the sign of $\Delta\lambda_P$ then is stored. When there are two even number vectors, the even number vector capable of decreasing $|\Delta\lambda_P|$ is selected. more specifically, when $\Delta\lambda_P$ is positive, the even number vector as being the magnetic flux decreasing vector is selected, and, when $\Delta\lambda_P$ is negative, the even number vector as being the magnetic flux increasing vector is selected. $|\Delta\lambda_P|$ is progressively decreased and, when $\Delta\lambda_P$ reaches zero, the process goes forward to Step 2. When the deviation goes out of the tolerance before $|\Delta\lambda_P|$ reaches zero, if $\Delta\lambda_P$ is negative, the process goes forward to Step 2, and, if $\Delta\lambda_P$ is positive, $\Delta\lambda_P$ is substituted for a second threshold value $S_2$ and the process goes forward to step 4.

Step 2 ... A zero vector as being the odd number vector is selected. $\Delta\theta\lambda_P$ is progressively decreased, and, when $\Delta\theta\lambda_P$ reaches zero, the process goes forward to Step 3.

Step 3 ... The control vector as being the even number vector is selected. When there are two even number vectors, if the sign of $\Delta\lambda_P$ which has been stored is positive, then the even number vector as being the magnetic flux decreasing vector is selected, and, if the sign is negative, then the even number vector as being the magnetic flux increasing vector is selected. Thus, the deviation is progressively increased, and, when the deviation reaches a first threshold value (on the line $S_1$ in FIG. 27), the value of $\Delta\lambda_P$ then is stored as a second threshold value, and the process goes forward to Step 4. When sum ($\Delta\lambda_P+S_2$) of $\Delta\lambda_P$ and the second threshold value $S_2$ which has been stored in Step 6 described below reaches zero before the deviation reaches the first threshold value, the process goes forward to Step 4 under this condition.

Step 4 ... The control vector as being the odd number vector is selected, and the sign of $\Delta\lambda_P$ then is stored. When there are two odd number vectors, the odd number vector capable of decreasing $|\Delta\lambda_P|$ is selected. More specifically, when $\Delta\lambda_P$ is positive, the odd number vector as being the magnetic flux decreasing vector is selected, and, when $\Delta\lambda_P$ is negative, the odd number vector as being the magnetic flux increasing vector is selected. Thus, $|\Delta\lambda_P|$ is progressively decreased, and, when $|\Delta\lambda_P|$ reaches zero, the process goes forward to Step 5. When the deviation goes out of the tolerance before $|\Delta\lambda_P|$ reaches zero, if $\Delta\lambda_P$ is negative, then the process goes forward to Step 5, and, if $\Delta\lambda_P$ is positive, then $\Delta\lambda_P$ is substituted for the second threshold value $S_2$ and the process goes back to Step 1.

Step 5 ... A zero vector as being the even number vector is selected. Thus, $\Delta\theta\lambda_P$ is progressively decreased, and, when $\Delta\theta\lambda_P$ reaches zero, the process goes forward to Step 6.

Step 6 ... The control vector as being the odd number vector is selected. When there are two odd number vectors, if the sign of $\Delta\lambda_P$ which has been stored is positive, the odd number vector as being the magnetic flux decreasing vector is selected, and, if the sign is negative, then the odd number vector being as the magnetic flux increasing vector is selected. Thus, the deviation is progressively increased, and, when the deviation reaches the first threshold value (on the line $S_1$ in FIG. 27), the value of $\Delta\lambda_P$ then is stored as a second threshold value $S_2$, and the process goes back to Step 1. When sum ($\Delta\lambda_P+S_2$) of $\Delta\lambda_P$ and the second threshold value $S_2$ which has been stored in Step 3 reaches zero before the deviation reaches the first threshold value, the process goes back to Step 1 under this condition.

And in FIG. 27, line $S_2$ shows the opposite polarity and same value of $\Delta\lambda_P$ which is stored as the second threshold value.

Figure 30:
FIG. 30 shows a locus of the motor magnetic flux obtained by the embodiments shown in FIGS. 28 and 26.

The voltage vectors are selected as described above, whereby deviation remains within the tolerance, so that the locus of the motor magnetic flux comes to be as shown in FIG. 30.

The above-described control is effected by the control system shown in FIG. 26, comprising: a VF converter 51 for converting an analog voltage into a pulse signal train; rate multipliers RM 52 and 53 for conducting given calculations in response to a plurality of input signals; ROM 54 and 55 having stored therein desired constants and data; counters 56, 57 and 58; a ROM 59 for conducting desired calculations; a comparator 60 for calculating a deviation $\Delta\theta\lambda_P$ in angle of rotation; adders 61 and 62 for conducting adding calculations; a ROM 63 having stored therein desired data and conducting calculations of given accuracies; a latch circuit 54 for latching a signal outputted from the ROM 59; ROM 65 having stored therein control vector data and conducting given calculations; a latch circuit 66 for latching a signal outputted from the ROM 65; waveform shaping circuits 67 and 68 for waveform-shaping a signal outputted from the ROM 65; and a binary counter 69 operating in response to an output signal from the waveform shaping circuit 68.

In the arrangement as described above, the VF converter 51 converts an analog signal commensurate to the DC voltage Vd into a pulse signal train and outputs the same to the RM 52 and 53. This pulse signal train indicates the magnitude $V_{Pn}$ of the voltage vector. Inputted to the ROM 54 are the angle of rotation $\theta\lambda_P$ of the motor magnetic flux from the counter 57, the control vector data from the latch 66 and the binary counter 69, and further, the normal/reverse rotation data. When the above-mentioned data are inputted thereto, normalized components $V_{Pn\theta}/V_{Pn}$ in the tangential direction and absolute values and signs of components $V_{Pnr}/V_{Pn}$ in the normal direction of the control vectors commensurate to the angle of rotation $\theta\lambda_P$ of the motor magnetic flux as shown in FIG. 25 are written into the ROM 54. So the normalized component $V_{Pn\theta}/V_{Pn}$ in the tangent direction of the control vector applied at present can be outputted to the ROM 55, the absolute value $|V_{Pnr}/V_{Pn}|$ of the normalized component in the normal direction can be outputted to the RM 53 and the sign thereof can be outputted to the counter 56. In addition to the aforesaid data, the switch on-off data of the control vectors commensurate to the rotational angle $\theta\lambda_P$ of the reference rotary magnetic flux are written into the ROM 54. Further, the aforesaid data in both the case of the control vectors for rotating the magnetic flux in the normal direction and the case of the control vectors for rotating the magnetic flux in the reverse direction are written in, whereby the switching in direction are made due to the normal/reverse rotation data.

With the above-described arrangement, when the control vector data, the angle of rotation $\theta\lambda_P$ of the motor magnetic flux and the normal/reverse rotation data are set in the ROM 54, the normalized component $V_{Pn\theta}/V_{Pn}$ in the tangential direction of the control vector then is instantaneously outputted from the ROM 54 to the ROM 55, the absolute value $|V_{Pnr}/V_{Pn}|$ of the normalized component in the normal direction to the RM 53, and the sign thereof to the counter 56, respectively. Furthermore, the switch on-off data commensurate to the set vector is outputted from the ROM 54.

The ROM 54 outputs the normalized component $V_{Pn\theta}/V_{Pn}$ in the tangential direction of the control vector to the ROM 55, the counter 56 outputs the magnitude $\lambda_P$ of the motor magnetic flux to the ROM 55, and the ROM 55 outputs the result $V_{Pn\theta}/V_{Pn}/\lambda_P$ obtained by dividing the normalized component $V_{Pn\theta}/V_{Pn}$ in the tangential direction of the control vector by the magnitude $\lambda_P$ of the motor magnetic flux. In order to allow the ROM 55 conduct the above-mentioned calculation, the quotient $V_{Pn\theta}/V_{Pn}/\lambda_P$ is written into the ROM 55.

The RM 52 is inputted thereto with $V_{Pn\theta}/V_{Pn}/\lambda_P$ outputted from the ROM 55, also inputted thereto with the magnitude $V_{Pn}$ of the voltage vector outputted from the VF converter 41 in the form of a pulse signal, and outputs the product obtained by multiplying the aforesaid inputs $V_{Pn\theta}/\lambda_P$ to the counter 57. Here, $V_{Pn\theta}/\lambda_P$ indicates the angular velocity of the motor magnetic flux. On the other hand, the RM 53 is inputted thereto with the magnitude $V_{Pn}$ of the voltage vector outputted from the VF converter 51 in the form of a pulse signal, also inputted thereto the absolute value $|V_{Pnr}/V_{Pn}|$ of the normalized component in the normal direction of the control vector from the ROM 54, and outputs the product $|V_{Pnr}|$ obtained by multiplying the aforesaid inputs in the form of a pulse signal to the counter 56. The counter 57 is inputted thereto with the angular velocities $V_{Pn\theta}/\lambda_P$ of the motor magnetic flux from the RM 52, and integrates the angular velocities to calculate the angle of rotation of the motor magnetic flux. Furthermore, the counter 57 is inputted at the up-down change-over terminal thereof with the normal/reverse rotation data to thereby select the rotating direction. The counter 58 inputs thereto with the angular velocities of the reference rotary magnetic flux, and integrates the angular velocities to calculate the angle of rotation of the reference rotary magnetic flux. Similarly to the counter 57, the counter 58 is inputted at the up-down change-over terminal thereof with the normal/reverse rotation data for selecting the rotating direction. Further, the counter 56 is inputted at the clock terminal thereof with the absolute value $|V_{Pnr}|$ of the component in the normal direction of the control vector from the RM 53, also inputted at the up-down change-over terminal thereof with the sign of $V_{Pnr}$ from the ROM 54, up-counts or down-counts $|V_{Pnr}|$ to calculate the magnitude of the motor magnetic flux and outputs the same to the ROM 55 and 59.

The comparator 60 is inputted with the angle $\theta\lambda_P$ of rotation of the motor magnetic flux from the counter 57, also inputted with the angle $\theta\lambda_{P0}$ of rotation of the reference rotary magnetic flux from the counter 58, and outputs a difference between the aforesaid inputs, i.e., the deviation $\Delta\theta\lambda_P$ in angle of rotation of the magnetic flux to the adder 61. In addition, the comparator 60 is inputted thereinto the normal/reverse rotation data and calculates:

during rotation in the normal direction, $$\Delta\lambda_P = \theta\lambda_P - \theta\lambda_{P0}$$

and during rotation in the reverse direction $$\Delta\theta\lambda_P = \theta\lambda_{P0} - \theta\lambda_P$$

The ROM 59 is inputted thereto with the magnitude command $\lambda_{P0}$ of the reference rotary magnetic flux, also inputted with the magnitude $\lambda_P$ of the motor magnetic flux from the counter 56, calculates the deviation $\Delta\lambda_P$ in magnitude of the magnetic flux on the basis of the aforesaid inputs and outputs the result. Here, the deviation $\Delta\lambda_P$ in magnitude of the magnetic flux is calculated in accordance with the following equation.

$$\Delta\lambda_P = (\lambda_P - \lambda_{P0})/\lambda_P$$

More specifically, the deviation $\Delta\lambda_P$ in magnitude of the magnetic flux is given at a value converted into a unit circle in this embodiment. Because of this, even when the magnitude of the motor magnetic flux is reduced, the approximating accuracy is maintained to a certain extent. In addition, an output from the ROM 59 is set at a value of $K \cdot \Delta\lambda_P$ which is obtained by multiplying the above-described deviation $\Delta\lambda_P$ in magnitude of the magnetic flux by a coefficient K. Here, the coefficient K is adapted to determine $\theta k$ in FIG. 23 and may be preferably set such that $\theta k = 30°$. In order to conduct the above-described calculations, the previously calculated results should be written into the ROM 59.

The adder 61 is inputted thereto the deviation $\Delta\theta\lambda_P$ in angle of rotation of the magnetic flux from the comparator 60, also inputted with the component of the deviation $K \cdot \Delta\lambda_P$ in magnitude of the magnetic flux with the sign bit being removed, i.e., the absolute value $K|\Delta\lambda_P|$ of the deviation in magnitude of the magnetic flux from the ROM 59, adds the both inputs together and outputs the result $\Delta\lambda_P + K|\Delta\lambda_P|$ (a function for evaluation) to the ROM 63.

The latch 54 is inputted thereto the deviation $K \cdot \Delta\lambda_P$ in magnitude of the magnetic flux from the ROM 59, stores the deviation $K \cdot \alpha\lambda_P$ of the magnetic flux as being an input data in response to a clock signal inputted thereto from the ROM 65 through the waveform shaping circuit 67 and outputs the same to the adder 62. The data thus stored corresponds to the second threshold value $K \cdot S_2$ of the above-described method of selecting the voltage vectors. The adder 62 is inputted thereto with the second threshold value $K \cdot S_2$ from the latch 54, also inputted with the deviation $K \cdot \Delta\lambda_P$ in magnitude of the magnetic flux from the ROM 59, adds the both inputs together, discriminates as to whether the result of addition $K \cdot (\Delta\lambda_P + S_2)$ is zero or not, and outputs the result of discrimination to the ROM 65.

The ROM 63 is inputted thereto with the function for evaluation $\Delta\theta\lambda_P + K \cdot |\Delta\lambda_P|$ from the adder 61, also inputted with the approximating accuracy $\alpha$, multiplies the both inputs together, and outputs the product of multiplication to the ROM 65. Here, if the approximating accuracy data $\alpha$ is enlarged, then the deviation can be enlarged accordingly, so that the approximating accuracy can be improved. Also, if the approximating accuracy $\alpha$ is reduced, then the change-over frequency of the voltage vector can be lowered. In addition, to conduct the above-described calculations, the product of multiplication is previously written into the ROM 63. Furthermore, the ROM 65 is inputted thereto with the Step data from the latch 66, the sign of $\Delta\theta\lambda_P$ from the comparator 60, the function for evaluation $\alpha \cdot (\lambda_P + K|\Delta\lambda_P|)$ from the ROM 63, the sign of $\Delta\lambda_P$ from the ROM 59, and a zero flag as to whether $\Delta\lambda_P + S_2$ is zero or not from the adder 62. This ROM 65 controls an input data to the latch 66 for outputting the control vector data so that the control vector can be selected by the above-described method of selecting the voltage vectors, clock signals to the latches 66, 54 and the binary counter 69, in response to the aforesaid input data. In order to conduct this control, the ROM 65 should output the control vector data to be subsequently selected to the latch 66 when the input data to the ROM 65 reaches a value where the control vector is to be changed, should output the clock signals to the latch 66 so that the latch 66 can store the aforesaid control vector data, and further, should output the clock signal to the latch 54 when the input data reaches a value where the second threshold value is to be changed. Then, in the ROM 65, there are written a series of control vector data (the control vector/zero vector data, and the sign +/−data of $\Delta\lambda_P$), the Step data and the clock data.

Here, the Step data are the data for learning what Step is being carried out during the above-described method of selecting the voltage vectors. The Step data is outputted to the latch 66 from the ROM 65, and the Step data stored by the 66 is fed back to the ROM 65. Except for the difference in use of either even number vectors or the odd number vectors, processing of Steps 1 through 3 and that of Steps 4 through 6 are similar to each other, whereby the Step data consists of two bits. The even number vector/odd number vector data of the control vector data is formed by binary-counting the clock signal to the latch 66, because this clock signal is outputted from the ROM 65 when the control vector is to be changed. Additionally, the clock signals to the latches 66 and 54 are formed such that the outputs from the ROM 65 are passed through the waveform shaping circuits 67 and 68 so as to avoid the hazard effect.

In the embodiment shown in FIG. 26, bit numbers of the parallel data such as $V_{Pn\theta}/V_{Pn}$, $|V_{Pnr}/V_{Pn}|$, $\theta\lambda_P$, $\lambda_P$, $\theta\lambda_{P0}$, $\lambda_{P0}$, $V_{Pn\theta}/V_{Pn}/\lambda_P$, $\Delta\theta\lambda_P$, $\Delta\lambda_P$, $\alpha$, $\Delta\lambda_P + K|\Delta\lambda_P|$, $\alpha \cdot (\Delta\lambda_P + K \cdot |\Delta\lambda_P|)$) may be desirably determined depending upon the field of application. Similarly, frequencies of the pulse data such as $\omega\lambda_P$ and $V_{Pn}$ may be desirably determined depending upon the filed of application in the same manner as in the above-described embodiment. Furthermore, the bit numbers are increased and the frequencies are raised, so that the approximating accuracy can be improved. On the contrary, the bit numbers are decreased and the frequencies are lowered, so that the circuit arrangement can be simplified.

The advantages obtainable through this embodiment are similar to those through the preceding embodiments. Moreover, this embodiment is advantageous in that the approximating accuracy can be further improved in the low speed region because the function for evaluation $\Delta\lambda_P + K \cdot |\Delta\lambda_P|$ can be enlarged or reduced by the approximating accuracy data $\alpha$, so that the approximating accuracy can be desirably determined in accordance with the operating conditions. The deviation $\alpha\lambda_P$ in magnitude of the motor magnetic flux can be controlled such that the plus components and the minus components are alternately repeated in the same manner as in the second embodiment. Moreover, the amplitudes of the plus components and the minus components can be controlled to be less than ever. Because of this, as compared with the second embodiment, in this embodiment, the plus components and the minus components satisfactorily offset each other, so that the deviation in magnitude of the magnetic flux of the low order can be reduced. Furthermore, the motor magnetic flux can approximate the reference rotary magnetic flux having a desirable magnitude and a desirable rotational speed in accordance with the operating conditions. Since the velocity of the magnetic flux can be calculated on the basis of the fluctuations of the DC voltage Vd, this embodiment can be applied to the DC power source including many voltage ripples. The component in the tangential direction and the component in the normal direction of the control vector are calculated on the basis of the angle of rotation of the motor magnetic flux, so that, in this embodiment, the accuracy is improved as compared with the first and the second embodiments.

Further, the advantages obtainable through the digitalization are as described above.

Figure 28:
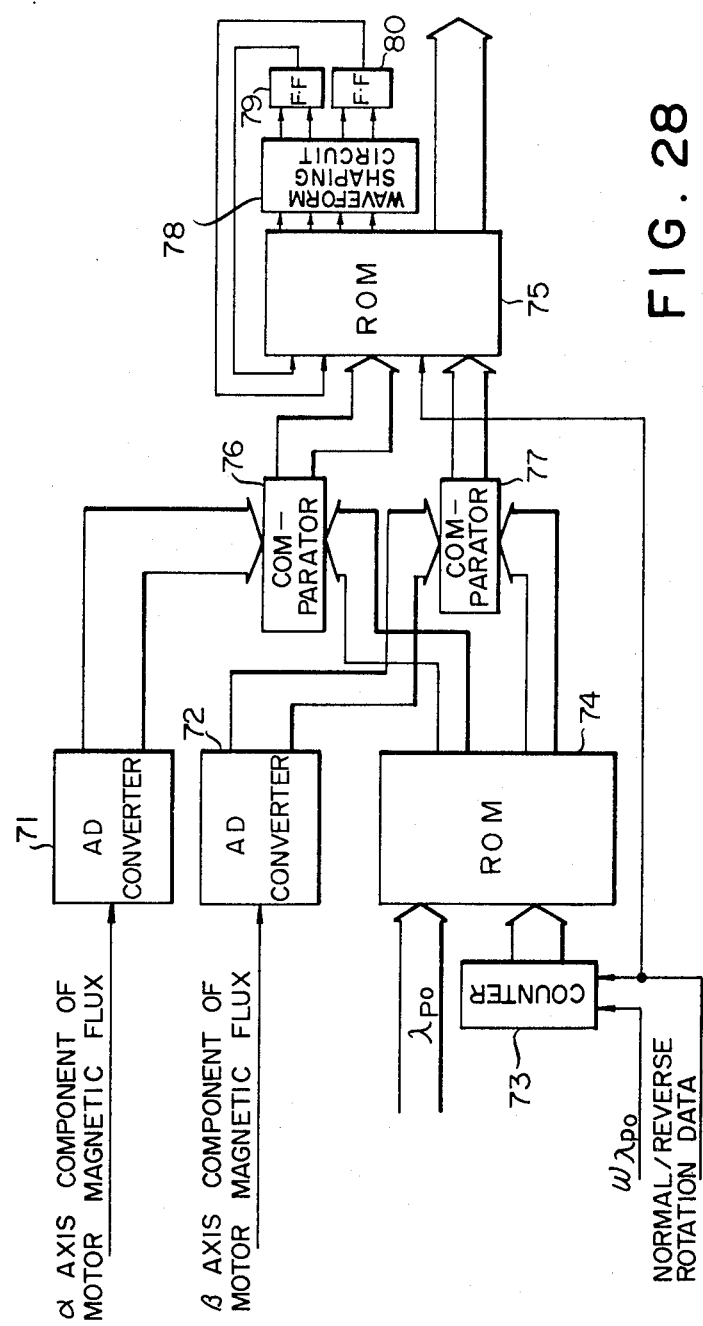
FIG. 28 is a block diagram showing a fourth embodiment of the present invention.

FIG. 28 is a block diagram showing the fourth embodiment of the present invention. This embodiment shows case where the motor magnetic flux is directly detected by a magnetic flux sensor and the voltage vectors are selected such that the motor magnetic flux approximates the reference rotary magnetic flux. This embodiment can approximate the motor magnetic flux to the reference rotary magnetic flux having a desirable magnitude and a desirable rotational speed without being subjected to the adverse effect of the DC voltage including many voltage ripples. In this embodiment, the fluctuation in magnitude of the motor magnetic flux can be controlled such that the plus components and the minus components of $\Delta\lambda_P$ are alternately repeated in the same manner as in the third embodiment, whereby the both components offset each other, so that the fluctuations in magnitude of the magnetic flux of the low order can be reduced.

Description will hereunder be given of the method of selecting the voltage vectors according to this embodiment.

Figure 29:
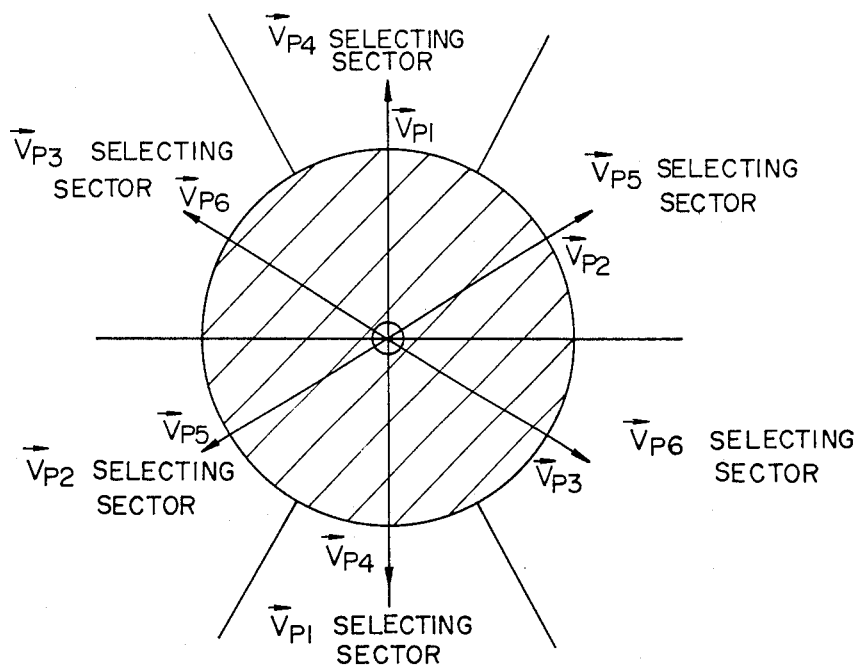
FIG. 29 is an explanatory view explaining the selection of the voltage vectors in the embodiment shown in FIG. 28.

As shown in FIG. 29, a large and a small circles are drawn as centered about the origin on the rectangular coordinates having axes $\alpha$ and $\beta$, and a tolerance indicated by hatching is set. On the coordinates, there are drawn six voltage vectors and border lines passing the midpoints between the voltage vectors adjacent to one another, beyond the tolerance. The six sectors divided by the border lines, beyond the tolerance, are the sectors in each of which a voltage vector located in a position symmetrical with respect to the voltage vector positioned at the midpoint of each sector is unconditionally selected. If setting is made as in FIG. 29, when the deviations $\Delta\lambda_{P\alpha}$ and $\Delta\lambda_{P\beta}$ are present beyond the tolerance, the voltage vectors are selected such that the deviations are varied to enter the tolerance, whereby the deviations are forced to enter the tolerance. When the deviations are present within the tolerance, the voltage vectors are selected in the following manner.

Step 1 . . . Out of two voltage vectors located in positions symmetrical with respect to two voltage vectors disposed at opposite sides of the deviation, such voltage vectors are selected that the even number vector and the odd number vector are alternately selected. This condition continues until the deviation crosses the voltage vector or comes onto the inner circle. When the deviation crosses the voltage vector, the process goes forward to Step 2. When the deviation comes onto the inner circle, the process goes forward to Step 3.

Step 2 . . . The voltage vectors located at a positions symmetrical with respect to the voltage vector crossed by the deviation are selected. In this case, the deviation is progressively decreased, and, when the deviation comes onto the inner circle, the process goes forward to Step 3. In addition, when the deviation crosses another voltage vector before it comes onto the inner circle, Step 2 is repeated.

Step 3 . . . Out of the zero vectors $\vec{V}_{P0}$ and $\vec{V}_{P7}$, such a zero vector is selected that the even number vector and the odd number vector are alternately selected. The deviation is progressively increased and, when the deviation comes onto the outer circle, the process goes back to Step 1.

The voltage vectors are selected as described above, the deviation remains within the tolerance, so that the locus of the motor magnetic flux can be one as shown in FIG. 30 in the same manner as the third embodiment. In addition, the voltage vectors selected in Step 2 come to be the voltage vectors located adjacent the voltage vectors, which have been selected immediately before, so that the even number vector and the odd number vector can be alternately selected without fail. In consequence, all the time from Step 1 to Step 3, the even number vector and the odd number vector are alternately selected.

The above-described control is conducted by the control system shown in FIG. 28, comprising: A/D converters 71 and 72 for converting an analog signal into a digital signal; a counter 73 for integrating input pulse signals; ROM 74 and 75 for conducting required calculations on the basis of stored constants and input data; comparators 76 and 77 for outputting a difference in level between two signals; a waveform shaping circuit 78 for waveform-shaping a signal outputted from ROM 75; and flip-flop circuits 79 and 80 set and reset by an output signal from the aforesaid circuit 78.

In the above-described arrangement, the A/D converter 71 is inputted thereto with an $\alpha$ axis component of the motor magnetic flux from the magnetic flux sensor, converts the $\alpha$ axis component into a digital signal and outputs the same to the comparator 76. Similarly, the A/D converter 72 is inputted thereto with a $\beta$ axis component of the motor magnetic flux from the magnetic flux sensor, converts the $\beta$ axis component into a digital signal and outputs the same to the comparator 77. The counter 73 is inputted thereto with an angular velocity $\omega\lambda_{P0}$ of the reference rotary magnetic flux proportional to the frequencies of the inverter as a pulse signal, integrates the pulse signals to calculate an angle $\theta\lambda_{P0}$ of rotation of the reference rotary magnetic flux, and outputs the result of calculations to the ROM 74. The up action and down action of the counter is changed over to each other in response to the normal/reverse rotation data, to thereby select the rotating direction of the reference rotary magnetic flux.

The ROM 74 is inputted thereto with the command of magnitude $\lambda_{P0}$ of the reference rotary magnetic flux and the angle $\theta\lambda_{P0}$ of rotation of the reference rotary magnetic flux from the counter 73, calculates the $\alpha$ axis component $\lambda_{P0\alpha}$ and the $\beta$ axis component $\lambda_{P0\beta}$ of the reference rotary magnetic flux on the basis of the aforesaid input data, outputs $\lambda_{P0\alpha}$ to the comparator 76 and $\lambda_{P0\beta}$ to the comparator 77. The $\alpha$ axis component $\lambda_{P0\alpha}$ and the $\beta$ axis component $\lambda_{P0\beta}$ of the reference rotary magnetic flux commensurate to the angle $\theta\lambda_{P0}$ of rotation and the magnitude $\lambda_{P0}$ of the reference rotary magnetic flux are previously calculated and written into the ROM 74, in order to conduct the above-described calculations.

The comparator 76 is inputted thereto with the $\alpha$ axis component $\lambda_{P\alpha}$ of the motor magnetic flux from the A/D converter 71 and the $\alpha$ axis component $\lambda_{P0\alpha}$ of the reference rotary magnetic flux from the ROM 74, calculates a difference therebetween, i.e., a deviation $\Delta\lambda_{P\alpha}=\lambda_{P\alpha}-\lambda_{P0\alpha}$ of the α axis component of the magnetic flux, and outputs the same to the ROM 75. Similarly, the comparator 77 is inputted thereto with the β axis component $\lambda_{P\beta}$ of the motor magnetic flux from the A/D converter 72 and the β axis component of the reference rotary magnetic flux from the ROM 74, and, in response thereto, outputs a deviation of the β axis component of the magnetic flux $\Delta\lambda_{P\beta}=\lambda_{P\beta}-\lambda_{P0\beta}$ to the ROM 75.

The ROM 75 is inputted the deviation $\Delta\lambda_{P\alpha}$ of the α axis component of the magnetic flux from the comparator 76, the deviation $\Delta\lambda_{P\beta}$ of the β axis component of the magnetic flux from the comparator 77, the step data and the even number vector/odd number vector data from the flip-flop circuit 79 and 80, and further the normal/reverse rotation data from outside. Thus, the ROM 75 selects the control vector by the above-described method of selecting the voltage vectors on the basis of the aforesaid data, and outputs the switch on-off data corresponding to the selected control vector. Here, the Step data are the data for learning which Step is under way in the aforesaid method of selecting the voltage vectors. The ROM 75 outputs a set signal or a reset signal to the flip-flop circuit 79 outputting the Step data, and the Step data stored by the flip-flop circuit 79 is fed back to the ROM 75. Since it suffices to use bit data for distinguishing Steps 1 and 2 from 3 as the Step data in this embodiment, such an arrangement is adopted that a set signal or a reset signal is emitted at the time of change-over from Step 2 to Step 3 and of change-over from Step 3 to Step 1. On the other hand, the even number vector/odd number vector data are formed such that the ROM 75 outputs a set signal or a reset signal to the flip-flop circuit 80 at the time of change-over from one voltage vector to another, and the data are fed back to the ROM 75.

To effect the above-described control, a series of switch on-off data, a set signal and a reset signal of the flip-flop circuits 79 and 80 corresponding to the input data are written in the ROM 75. To avoid the adverse effect of hazard, the waveform shaping circuit 78 is interposed between the ROM 75 and the flip-flop circuits 79, 80.

In this embodiment, bit numbers of the parallel data such as the α axis component $\lambda_{P\alpha}$ of the motor magnetic flux, the β axis component $\lambda_{P\beta}$, the command of magnitude $\lambda_{P0}$ of the reference rotary magnetic flux, the angle $\theta\lambda_{P0}$ of rotation of the reference rotary magnetic flux, the deviation of the α axis component $\Delta\lambda_{P\alpha}$ of the magnetic flux and the deviation of the β axis component $\Delta\lambda_{P\beta}$, and frequencies of the command of the angular velocity of the reference rotary magnetic flux may be desirably determined depending upon the field of application. Further, the bit numbers are increased and the frequencies are raised, so that the approximating accuracy can be improved. On the contrary, the bit numbers are decreased and the frequencies are lowered, so that circuit arrangement can be simplified.

Further, this embodiment is the example directly detecting the motor magnetic flux by the sensor and treating with α, β coordinates. As shown in the first and third embodiments, the motor magnetic flux can be detected by the calculation on the data of the selected control vector and treated with α, β coordinates.

In this embodiment, the deviation of the magnetic flux occurring in Step 3 takes place because only the reference rotary magnetic flux rotates, whereby the deviation of the magnetic flux takes place in a direction different entirely through 180° from the direction to which the motor magnetic flux should be moved. Because of this, the voltage vectors selected to offset the above-described deviation of magnetic flux in Steps 1 and 2 are the control vectors which should necessarily rotate the magnetic flux in the desired direction. In consequence, in this embodiment, the voltage vectors to be selected include only the control vectors rotating the magnetic flux in the desired direction and zero vectors, whereby the locus of the motor magnetic flux does not draw a useless loop, so that iron loss can be reduced. Furthermore, the motor magnetic flux is directly controlled, so that drop of the maximum output voltage as in the triangle interception method and the adverse effect of non-linear properties of iron as in the electric current control method can be avoided. Furthermore, the voltage vectors are selected such that the even number vector and the odd number vector are alternately repeated, whereby the commutation number is decreased, so that the switching loss can be reduced.

Further, the fluctuation in magnitude of the motor magnetic flux can be controlled such that the plus components and the minus components thereof are alternately repeated in the same manner as in the third embodiment, whereby the both components offset each other, so that the fluctuations in magnitude of the magnetic flux of the low order can be reduced. The magnitude and rotational speed of the motor magnetic flux can be approximated to the reference rotary magnetic flux having a desired magnitude and a desired rotational speed without being affected by the DC voltage ripples. Further, the adoption of the digital circuit arrangement makes it possible to avoid the adverse effects such as drift, offset and the like.

In addition, the above-described embodiments have shown the cases where the digital circuits are adopted. However, it is possible to adopt the analog circuits, and further, processing can be conducted by to of a microcomputer.

As has been apparent from the foregoing, according to the present invention, the magnetic flux is directly controlled, so that the motor magnetic flux can be approximated to the reference rotary magnetic flux with no drop of the maximum output voltage and without being affected by non-linear properties of iron and the iron loss and switching loss can be reduced. Furthermore, even when ripples are present in the DC power source, the inverter can be operated.

What is claimed is:

1. A method of controlling an inverter having a plurality of switches comprising the steps of:
  determining a desired magnetic flux as a reference rotary magnetic flux for an AC motor to be controlled;
  detecting an actual magnetic flux of said AC motor;
  detecting a deviation between said actual magnetic flux of said AC motor and said reference rotary magnetic flux;
  comparing said deviation with reference values corresponding to a permissible region of said deviation on a vector plane;
  selecting a voltage vector from among the voltage vectors of said AC motor determined by the ON-OFF pattern of said switches in said inverter, to maintain said deviation within said permissible region and hold the actual magnetic flux of said AC motor within a permissible tolerance with respect to said desired magnetic flux to smoothly rotate said AC motor, the number of said voltage vectors being defined by 2N, where N is equal to the number of said switches.

2. A method of controlling an inverter having a plurality of switches, comprising the steps of:
  determining a desired magnetic flux as a reference rotary magnetic flux for an AC motor to be controlled;
  detecting an actual magnetic flux of said AC motor;
  detecting a deviation between said actual magnetic flux of said AC motor and said reference rotary magnetic flux;
  comparing said deviation with reference values corresponding to a permissible region of said deviation on a vector plane; and
  selecting a voltage vector directed to a mid-region within said permissible region from among those voltage vectors of said AC motor determined by the ON-OFF pattern of said switches and said inverter, to maintain said deviation within said permissible region and hold the actual magnetic flux of said AC motor within a tolerance permissible for said desired magnetic flux to smoothly rotate said AC motor, the number of said voltage vectors being defined by 2N, where N is equal to the number of said switches.

3. System of controlling a voltage source inverter for controlling an AC motor as a load, comprising:
  a reference rotary magnetic flux setting circuit for setting a desired rotary magnetic flux;
  a magnetic flux detecting circuit for detecting the magnetic flux of said motor in operation;
  a magnetic flux deviation calculating circuit for calculating a deviation between an output signal from said detecting circuit and an output signal from said reference rotary magnetic flux setting circuit and outputting the calculated deviation;
  a voltage vector selecting circuit for selecting such voltage vectors that the deviation outputted from said magnetic flux deviation calculating circuit may be held within a preset tolerance; and
  a calculating circuit for seeking inverter control data on the basis of the voltage vectors selected by said voltage vector selecting circuit.

4. Method of controlling an inverter as set forth in claim 1, wherein the portion of the vector plane other than said permissible region of deviation is divided into a plurality of sectors, and wherein said selecting step includes selecting the sector beyond the permissible region to which said deviation belongs and selecting the voltage vectors corresponding to the detected sector and which allow said deviation to enter the permissible region from beyond the permissible region.

5. Method of controlling an inverter as set forth in claim 1, wherein said reference rotary magnetic flux value and said actual magnetic flux value of the AC motor are worked on rectangular coordinates and said deviation is processed by being divided into an ordinate axis component and an abscissa axis component of the rectangular coordinates.

6. Method of controlling an inverter as set forth in claim 4, wherein said reference rotary magnetic flux value and said actual magnetic flux value of the AC motor are worked on rectangular coordinates and said deviation is processed by being divided into an ordinate axis component and an abscissa axis component of the rectangular coordinates.

7. Method of controlling an inverter as set forth in claim 1, wherein said reference rotary magnetic flux value and said actual magnetic flux value of the AC motor are worked on polar coordinates and said deviation is processed by being divided into a component in a direction of normal line and a component in a direction of tangential line of said magnetic flux.

8. Method of controlling an inverter as set forth in claim 4, wherein said reference rotary magnetic flux value and said actual magnetic flux value of the AC motor are worked on polar coordinates and said deviation is processed by being divided into a component in a direction of normal line and a component in a direction of tangential line of said magnetic flux.

9. Method of controlling an inverter as set forth in claim 1, wherein said selected voltage vectors are integrated to seek the actual magnetic flux of the AC motor.

10. Method of controlling an inverter as set forth in claim 4, wherein said selected voltage vectors are integrated to seek the actual magnetic flux of the AC motor.

11. Method of controlling an inverter as set forth in claim 5, wherein said selected voltage vectors are integrated to seek the actual magnetic flux of the AC motor.

12. Method of controlling an inverter as set forth in claim 6, wherein said selected voltage vectors are integrated to seek the actual magnetic flux of the AC motor.

13. Method of controlling an inverter as set forth in claim 7, wherein said selected voltage vectors are integrated to seek the actual magnetic flux of the AC motor.

14. Method of controlling an inverter as set forth in claim 1, wherein a function for evaluation of said deviation and a perset threshold value are compared with each other, and, when the function for evaluation of said deviation reaches said threshold value, the voltage vectors, which do not go out of said permissible region, are selected.

15. Method for controlling an inverter as set forth in claim 14, wherein the voltage vectors for rotating the magnetic flux in such a rotating direction that said deviation is held within said permissible region and a zero vector are selected, and the magnetic flux of said AC motor is made to approximate the desired reference rotary magnetic flux.

16. Method of controlling an inverter as set forth in claim 14, wherein as said voltage vectors are selected, there are selected a first control vector for fastly rotating said magnetic flux with a predetermined width of fluctuations in a desired direction, a second control vector for rotating said magnetic flux in a desired direction with said magnetic flux being increased in magnitude, a third control vector for rotating said magnetic flux in a desired direction with said magnetic flux being decreased in magnitude, and a zero vector for stopping the rotation of said magnetic flux.

17. Method of controlling an inverter as set forth in claim 14, wherein as said voltage vectors are selected, there are selected a magnetic flux increasing vector for rotating said magnetic flux with said magnetic flux being increased in magnitude, a magnetic flux decreasing vector for rotating said magnetic flux with said magnetic flux being decrease in magnitude, and a zero vector for stopping the rotation of said magnetic flux.

18. Method of controlling an inverter as set forth in claim 14, wherein as said voltage vectors are selected, there are selected two voltage vectors symmetrical to the voltage vectors disposed at opposite sides of said deviation and a zero vector for stopping the rotation of said magnetic flux.

19. Method of controlling an inverter as set forth in claim 14, wherein as said voltage vectors are selected, there are alternately selected an even number vector and an odd number vector, both of which are determined by the number of phases connected to one of the poles of the power source connected to the AC motor through the inverter.

20. System of controlling an inverter as set forth in claim 3, wherein said voltage vector selecting circuit selects only the voltage vectors for rotating the magnetic flux of said motor in a desired direction or a zero vector for stopping the operation of said motor.

* * * * *